US012696298B2

(12) United States Patent
Shrivastava et al.

(10) Patent No.: US 12,696,298 B2
(45) Date of Patent: Jul. 28, 2026

(54) METHOD AND APPARATUS FOR RESOURCE ALLOCATION AND OPERATION IN A WIRELESS COMMUNICATION SYSTEM SUPPORTING UNICAST AND MULTICAST/BROADCAST SERVICE

(71) Applicant: Samsung Electronics Co., Ltd., Suwon-si (KR)

(72) Inventors: Vinay Kumar Shrivastava, Bangalore (IN); Diwakar Sharma, Bangalore (IN); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 18/268,528

(22) PCT Filed: Dec. 24, 2021

(86) PCT No.: PCT/KR2021/019886
§ 371 (c)(1),
(2) Date: Jun. 20, 2023

(87) PCT Pub. No.: WO2022/145908
PCT Pub. Date: Jul. 7, 2022

(65) Prior Publication Data
US 2024/0089704 A1 Mar. 14, 2024

(30) Foreign Application Priority Data

Dec. 28, 2020 (IN) .............................. 202041056767
Dec. 13, 2021 (IN) ............................ 2020 41056767

(51) Int. Cl.
*H04W 4/06* (2009.01)
*H04W 72/0446* (2023.01)
(Continued)

(52) U.S. Cl.
CPC ............. *H04W 72/30* (2023.01); *H04W 4/06* (2013.01); *H04W 72/0446* (2013.01);
(Continued)

(58) Field of Classification Search
CPC .. H04L 5/0001–0098; H04W 4/06–10; H04W 8/22–245; H04W 48/02–20;
(Continued)

(56) References Cited

U.S. PATENT DOCUMENTS

2017/0290014 A1 10/2017 Kim et al.
2018/0206080 A1 7/2018 Chen et al.
(Continued)

FOREIGN PATENT DOCUMENTS

CN 110463316 A 11/2019
CN 111971925 A 11/2020
KR 10-2017-0111965 A 10/2017

OTHER PUBLICATIONS

Huawei et al., Resource configuration and group scheduling for RRC_CONNECTED UEs, R1-2007562, 3GPP TSG RAN WG1 Meeting #103-e, E-meeting, Nov. 1, 2020.
(Continued)

*Primary Examiner* — Timothy J Weidner
(74) *Attorney, Agent, or Firm* — Jefferson IP Law, LLP

(57) ABSTRACT

Embodiments herein disclose a method and apparatus for resource allocation in a wireless communication system supporting multicast and broadcast services (MBS). The method comprises receiving, from a base station, configuration information associated with the MBS, and receiving, from the base station, MBS data on a common frequency resource (CFR) configured based on the configuration information, wherein the CFR is configured in a unicast bandwidth part (BWP).

20 Claims, 15 Drawing Sheets

(51) Int. Cl.

| | |
|---|---|
| *H04W 72/0453* | (2023.01) |
| *H04W 72/231* | (2023.01) |
| *H04W 72/232* | (2023.01) |
| *H04W 72/30* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ..... *H04W 72/0453* (2013.01); *H04W 72/231* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04W 72/02–569; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2019/0132110 A1 | 5/2019 | Zhou et al. | |
| 2019/0132855 A1 | 5/2019 | Lee et al. | |
| 2019/0238407 A1 | 8/2019 | Papa | |
| 2019/0313437 A1 | 10/2019 | Jung et al. | |
| 2019/0364616 A1 | 11/2019 | Mishra et al. | |
| 2019/0373667 A1 | 12/2019 | Jeon et al. | |
| 2023/0049868 A1* | 2/2023 | Zhou .................... | H04W 72/23 |
| 2023/0388092 A1* | 11/2023 | Lei ..................... | H04W 72/232 |

OTHER PUBLICATIONS

Intel Corporation, Group Scheduling for NR MBS, R1-2009000, 3GPP TSG RAN WG1 #103-e, e-Meeting, Nov. 1, 2020.
CMCC, Discussion on group scheduling mechanisms, R1-2008034, 3GPP TSG RAN WG1 #103-e, e-Meeting Nov. 1, 2020.
Indian Office Action dated Jul. 19, 2022, issued in Indian Patent Application No. 202041056767.
Moderator(CMCC); 3GPP TSG RAN WG1 #103-e; R1-200XXXX; Summary#2 on mechanisms to support group scheduling for RRC_CONNECTED UEs for NR MBS, Nov. 11, 2020.
Chinese Office Action dated Dec. 8, 2025, issued in a Chinese Patent pplication No. 202180088086.6.
Chinese Office Action dated May 16, 2026, issued in a Chinese Patent Application No. 202180088086.6.

\* cited by examiner

Unicast BWP
X

MBS BWP/
Freq Resource
Y

METHOD AND APPARATUS FOR RESOURCE ALLOCATION AND OPERATION IN A WIRELESS COMMUNICATION SYSTEM SUPPORTING UNICAST AND MULTICAST/BROADCAST SERVICE

CROSS-REFERENCE TO RELATED APPLICATION(S)

This application is a U.S. National Stage application under 35 U.S.C. § 371 of an International application number PCT/KR2021/019886, filed on Dec. 24, 2021, which is based on and claims the benefit of an Indian Provisional patent application number 202041056767, filed on Dec. 28, 2020, in the Indian Intellectual Property Office, and of an Indian Complete patent application number 202041056767, filed on Dec. 13, 2021, in the Indian Intellectual Property Office, the disclosure of each of which is incorporated by reference herein in its entirety.

TECHNICAL FIELD

Embodiments disclosed herein relate to multicast/broadcast services in Fifth Generation (5G) communication networks and more particularly to resource allocation and operation for multicast/broadcast services in 5G networks.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Legacy Multimedia Broadcast Multicast Services (MBMS) are supported in Fourth Generation 4G Long Term Evolution (LTE) wireless systems. However, architecture and requirements of 5G Multicast Broadcast Services (MBS) could be very different compared to 4G LTE networks.

Specifically, multicast services refer to services being transmitted and availed by a set of User Equipments (UEs) registered to a group, for e.g., MCPTT (Mission Critical Push-To-Talk) service. Broadcast services refer to services being transmitted and available to all the UEs in a specific coverage area where broadcast is performed and typically, the UE does not need be registered to avail broadcast services. Therefore, effectively, both multicast and broadcast services are PTM (Point-To-MultiPoint) services as there is one transmitter and multiple recipient of contents. Similarly, the multicast and broadcast services are provided in a PTP (Point-to-Point) manner which includes multiple PTP connections to share same MBS services with multiple recipients. Apart from the MBS, there are another category of services termed as unicast services which is meant for one recipient only. For the unicast services, one to one dedicated connection between transmitter and receiver is required.

A PTM bearer, PTP bearer or a combination of PTM and PTP bearers can carry the same MBS service. The combination of PTM and PTP bearers may provide a lot of features with respect to increased reliability of reception of MBS service packets, efficient switching between these two modes of reception when needed, e.g., because of mobility, network loading conditions or based on the user request density for the reception of the MBS service and accordingly, the network may decide the delivery modes and/or switching across. A bearer configuration is referred to herein, which has possibly both legs of PTM and PTP termed as MBS split bearer.

DISCLOSURE OF INVENTION

Technical Problem

The aspect of the embodiments herein is to disclose a method and apparatus for resource allocation in a wireless communication system supporting multicast and broadcast services (MBS).

The aspect of the embodiments herein is to disclose a method and apparatus for resource allocation and operation for multicast/broadcast services in 5G networks, which includes several configuration modes or alternatives for the MBS BWP and/or common MBS CFRs (Common Frequency Resources).

Solution to Problem

Accordingly, the embodiments herein provide a method performed by a user equipment (UE) in a wireless communication system supporting multicast and broadcast services (MBS), the method comprises receiving, from a base station, configuration information associated with the MBS, and receiving, from the base station, MBS data on a common frequency resource (CFR) configured based on the configuration information, wherein the CFR is configured in a unicast bandwidth part (BWP).

Accordingly, the embodiments herein provide a UE in a wireless communication system supporting MBS, the UE comprises a transceiver, and a processor configured to receive, via the transceiver from a base station, configuration information associated with the MBS, and receive, via the transceiver from the base station, MBS data on a CFR configured based on the configuration information, wherein the CFR is configured in a unicast BWP.

Accordingly, the embodiments herein provide a method performed by a base station in a wireless communication system supporting MBS, the method comprises transmitting configuration information associated with the MBS, and transmitting MBS data on a CFR configured based on the configuration information, wherein the CFR is configured in a BWP.

Accordingly, the embodiments herein provide a base station in a wireless communication system supporting MBS, the base station comprises transmitting configuration information associated with the MBS, and transmitting MBS data on a CFR configured based on the configuration information, wherein the CFR is configured in a BWP.

Accordingly, the embodiments herein provide a method for allocating resources to multicast and broadcast services (MBS) in a network. The method includes determining, by a User Equipment (UE), resource allocation for MBS over at least one MBS BWP (Bandwidth Part) or CFR (Common Frequency Resource) and association of an MBS BWP or CFR with a unicast BWP. The MBS BWP or CFR can be one of fully confined within unicast BWP or partially overlapped with unicast BWP or separately spaced than that of unicast BWP. The method further includes, performing, by a UE, based on the determining an MBS BWP or CFR is fully confined within unicast BWP, receiving, by the UE (100), the MBS service on the MBS BWP or CFR within the activated unicast BWP in accordance with a Radio Resource Control (RRC) configuration, wherein if the unicast BWP is deactivated, then the UE stops receiving the MBS services on the BWP and terminates the MBS services. The method further includes, performing, by a UE, based on the determining an MBS BWP or CFR is one of partially overlapped with unicast BWP or is separately spaced than that of unicast BWP, receiving, by the UE (100), the MBS service on the MBS BWP or CFR with at least one of switching dynamically between MBS BWP or CFR and unicast BWP and utilizing a plurality of receiver chains such as employing carrier aggregation across MBS BWP/CFR and unicast BWP.

Embodiments herein further disclose the resource allocation for the at least one MBS BWP or CFR is provided in at least one of a Time Domain Resource allocation (TDRA) field and a Frequency Domain Resource Allocation (FDRA) field where in at least one of TDRA field and FDRA field for MBS is configured or preconfigured through at least one of RRC reconfiguration message or broadcasted message such as SIB (System Information Block) or MCCH (MBS Control Channel), and MBS resource allocation by at least one of TDRA field and FDRA field is dynamically indicated in the DCI (Downlink Control Information) signaling by PDCCH (Physical Downlink Control Channel). DCI is scrambled with G-RNTI for the pertinent MBS service.

Embodiments herein further disclose the method further includes sending, by the UE, a RRC connection request or a RRC Resume request to the network in order to continue receiving the MBS services and also includes indication for the MBS service and/or BWP/CFR information so as network configures the active downlink (DL) and/or uplink (UL) unicast BWP and/or MBS BWP or CFR suitably to support continuation of the MBS service reception for the UE in situation where the UE undertakes transition from idle mode or inactive mode to connected mode while receiving the MBS service in idle mode or inactive mode.

Embodiments herein further disclose the UE maintains a BWP inactivity timer while receiving the MBS services wherein BWP inactivity timer is configured by network through RRC signaling.

Embodiments herein further disclose the UE starts or restarts the BWP inactivity timer on receiving a PDCCH addressed to G-RNTI (Group Radio Network Temporary Identifier)/G-CS-RNTI (Group Configured Scheduled Radio Network Temporary Identifier) or C-RNTI (Cell Radio Network Temporary Identifier) indicating downlink assignment received on the MBS BWP or CFR or a MAC PDU is received in a configured downlink assignment for multicast.

Embodiments herein further disclose, upon expiry of the BWP inactivity timer while receiving MBS services, UE performs one of BWP switching to a default downlink BWP, if the default downlink BWP is configured, or BWP switching to the initial downlink BWP.

Embodiments herein further disclose, MBS-bwp-InactivityTimer is maintained for MBS service reception on MBS BWP or CFR. If a PDCCH addressed to G-RNTI/G-CS-RNTI or C-RNTI indicating downlink assignment received on the active MBS BWP or CFR or a MAC PDU is received in a configured downlink assignment for multicast, UE starts or restarts the MBS-bwp-InactivityTimer for MBS BWP or CFR associated with the active DL BWP. When both the bwp-InactivityTimer and MBS-bwp-InactivityTimer associated with the active DL BWP expire, UE performs BWP switching to a default downlink BWP, if the default downlink BWP is configured Otherwise, UE performs BWP switching to the initial downlink BWP.

Embodiments herein further disclose if the MBS service reception is configured and/or activated and pertains to the MBS BWP or the MBS sub BWPCFR within the unicast BWP then the UE starts receiving the MBS service on the activated MBS BWP or the MBS sub BWPCFR within activated unicast BWP in accordance with a Radio Resource Control (RRC) configuration.

Embodiments herein further disclose when the unicast BWP is deactivated, then the UE performs at least one of: clearing configured downlink assignment and configured uplink grant of configured grant Type 2 pertaining to at least one of the unicast services or the MBS services on the BWP; and suspending configured uplink grant of configured grant Type 1 pertaining to at least one of the unicast services or the MBS services on the BWP.

Embodiments herein further disclose upon deactivation or dormancy of the unicast BWP, the UE performs at least one of: stops receiving the MBS service on the MBS BWP/CFR associated with unicast BWP and terminates the MBS service; or switching switches the MBS service to one of the default BWP or an initial BWP.

Embodiments herein further disclose if the unicast BWP is re-activated, the MBS reception is switched back to the unicast BWP.

Embodiments herein further disclose if MBS service reception is configured and/or activated and pertains to the MBS BWP or CFR configured within the unicast BWP and unicast BWP is deactivated or made dormant and no uplink feedback is configured, UE continues receiving MBS service on the MBS BWP or CFR.

Embodiments herein further disclose if MBS service reception is for broadcast service and pertains to the MBS BWP or CFR configured within the unicast BWP and unicast BWP is deactivated or made dormant, UE continues receiving MBS service on the MBS BWP or CFR.

In an aspect, the embodiments herein provide a User Equipment (UE). The UE includes a memory, at least one processor, and a resource allocation controller. The memory and the at least one processor are connected with the resource allocation controller. The resource allocation controller is configured to determine resource allocation for MBS over at least one MBS BWP (Bandwidth Part) or CFR (Common Frequency Resource) and association of an MBS BWP or CFR with a unicast BWP, wherein an MBS BWP or CFR can be one of fully confined within unicast BWP or partially overlapped with unicast BWP or separately spaced than that of unicast BWP. The resource allocation controller is further configured, based on the determining an MBS BWP or CFR is fully confined within unicast BWP, to receive the MBS service on the MBS BWP or CFR within the activated unicast BWP in accordance with a Radio Resource Control (RRC) configuration if the unicast BWP is deactivated, then the resource allocation controller stops receiving the MBS services on the BWP and terminates the MBS services. The resource allocation controller is further configured, based on the determining an MBS B WP or CFR is one of partially overlapped with unicast BWP or is separately spaced than that of unicast BWP, to receive the MBS service on the MBS BWP or CFR with at least one of switching dynamically between MBS BWP or CFR and unicast BWP, and utilizing a plurality of receiver chains such as employing carrier aggregation across MBS BWP/CFR and unicast BWP.

Embodiments herein further disclose the resource allocation for the MBS BWP or CFR is provided in at least one of a Time Domain Resource allocation (TDRA) field and a Frequency Domain Resource Allocation (FDRA) field where in at least one of TDRA field and FDRA field for MBS is configured or preconfigured through at least one of RRC reconfiguration message or broadcasted message such as SIB (System Information Block) or MCCH (MBS Control Channel), and MBS resource allocation by at least one of TDRA field and FDRA field is dynamically indicated in the DCI (Downlink Control Information) signaling by PDCCH (Physical Downlink Control Channel). DCI is scrambled with G-RNTI for the pertinent MBS service.

Embodiments herein further disclose the resource allocation controller sends a RRC connection request or a RRC Resume request to the network and also including an indication for the at least one of MBS service and MBS BWP/CFR information in order to continue receiving the MBS services in situation where the UE (100) undertakes transition from one of idle mode or inactive mode to connected mode while receiving the MBS service in one of idle mode or inactive mode.

Embodiments herein further disclose the UE maintains a BWP inactivity timer while receiving the MBS services wherein BWP inactivity timer is configured by network through RRC signaling.

Embodiments herein further disclose the UE starts or restarts the BWP inactivity timer on receiving a PDCCH addressed to G-RNTI (Group Radio Network Temporary Identifier)/G-CS-RNTI (Group Configured Scheduled Radio Network Temporary Identifier) or C-RNTI (Cell Radio Network Temporary Identifier) indicating downlink assignment received on the MBS BWP or CFR or a MAC PDU is received in a configured downlink assignment for multicast.

Embodiments herein further disclose upon expiry of the BWP inactivity timer while receiving MBS services, UE performs one of BWP switching to a default downlink BWP, if the default downlink BWP is configured, or BWP switching to the initial downlink BWP.

Embodiments herein further disclose if the MBS service reception is configured and/or activated and pertains to the MBS BWP or CFR within the unicast BWP then the UE.

starts receiving the MBS service on the MBS BWP or CFR within activated unicast BWP in accordance with a Radio Resource Control (RRC) configuration.

Embodiments herein further disclose when the unicast BWP is deactivated, then the UE performs at least one of:

clearing configured downlink assignment and configured uplink grant of configured grant Type 2 pertaining to at least one of the unicast services or the MBS services on the BWP; and suspending configured uplink grant of configured grant Type 1 pertaining to at least one of the unicast services or the MBS services on the BWP.

Embodiments herein further disclose upon deactivation or dormancy of the unicast BWP, the UE (100) performs at least one of:

stops receiving the MBS service on the MBS BWP/CFR associated with unicast BWP and terminates the MBS service; or switches the MBS service to one of the default BWP or an initial BWP These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

MODE FOR THE INVENTION

Figures 1A, 1B:
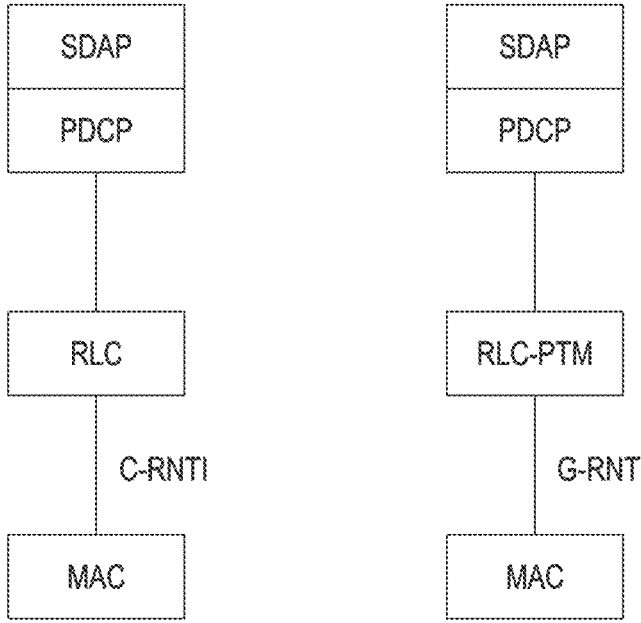
FIGS. 1A, 1B and 1C depict an example architecture for the protocol stack for the UE implementation supporting MBS services.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject that performs resource allocation to a user equipment (UE), and may be at least one of a gNode B, a gNB, an eNode B, an eNB, a Node B, a base station (BS), a radio access unit, a base station controller, or a node on a network. The base station may be a network entity, in an NR system, including at least one of an integrated access and backhaul (IAB)-donor that is a gNB which provides network access to a UE(s) via a network of backhaul and access links and an IAB-node that is a radio access network (RAN) node which supports NR access link(s) to a UE(s) and supports NR backhaul links to the IAB-donor or other IAB-nodes. A UE may be wirelessly connected via an IAB-node and may transmit or receive data to and from an IAB-donor connected to at least one IAB-node via a backhaul link.

A UE may include a terminal, a mobile station (MS), a cellular phone, a smartphone, a computer, or a multimedia system capable of performing communication functions. In the disclosure, a "downlink" refers to a radio link via which a base station transmits a signal to a UE, and an "uplink" refers to a radio link via which a UE transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have been developed from an initial wireless communication system providing a voice-oriented service to a broadband wireless communication system providing a high-speed and high-quality packet data service, such as those according to communication standards including a high-speed packet access (HSPA) of 3GPP, long-term evolution (LTE) (or evolved universal terrestrial radio access (E-UTRA)), LTE-advanced (LTE-A), LTE-Pro, high rate packet data (HRPD) of 3GPP2, ultra-mobile broadband (UMB), and 802.16e of IEEE.

In an LTE system, which is a representative example of the broadband wireless communication system, a downlink (DL) adopts an orthogonal frequency division multiplexing (OFDM) scheme and an uplink (UL) adopts a single carrier frequency division multiple access (SC-FDMA) scheme. The uplink refers to a radio link via which a UE transmits data or a control signal to a base station (BS) (or eNode B), and the downlink refers to a radio link via which a base station transmits data or a control signal to a UE. In such a multi-access scheme, normally data or control information of each user may be distinguished by assigning and operating time-frequency resources, at which the data or control information of each user is to be transmitted, so as not to overlap each other, that is, to establish orthogonality.

A 5G communication system, that is, a future communication system after LTE, should be able to freely reflect various requirements of users, service providers, etc., so that a service that concurrently satisfies various requirements should be supported. Services considered for the 5G communication system includes an enhanced mobile broadband (eMBB) communication, massive machine type communication (mMTC), ultra-reliability low latency communication (URLLC), and the like.

The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in a downlink and a peak data rate of 10 Gbps in an uplink from the perspective of one base station. The 5G communication system needs to provide a peak data rate while concurrently providing an increased actual user perceived data rate of a UE. In order to satisfy these requirements, improvement of various transmission or reception technologies including a more advanced multi-antenna (multi-input multi-output (MIMO)) transmission technology is required. A signal may be transmitted using a maximum transmission bandwidth of 20 MHz in a 2 GHz band used by LTE, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meantime, the mMTC is being considered to support application services, such as Internet of things (IoT), in the 5G communication system. In order to efficiently provide the IoT, the mMTC may require support of a large-scale UE access in a cell, coverage enhancement of a UE, an improved battery time, cost reduction of a UE, and the like. The IoT is attached to multiple sensors and various devices to support communication functions, so that the IoT should be able to support a large number of UEs (e.g., 1,000,000

UEs/km2) within a cell. Due to the nature of a service, a UE that supports the mMTC is likely to be located in a shaded region, which cannot be covered by a cell, such as the basement of a building, and therefore a wider coverage may be required compared to other services provided by the 5G communication system. The UE that supports the mMTC may be required to be a low-cost UE, and since it is difficult to frequently replace a battery of the UE, a very long battery lifetime, such as 10 to 15 years, may be required.

Finally, the URLLC corresponds to a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by the URLLC should also provide very low latency and very high reliability. For example, a service that supports the URLLC should satisfy an air interface latency less than 0.5 milliseconds and has requirements of a packet error rate of 10-5 or less at the same time. Therefore, for the service that supports the URLLC, the 5G system may be required to provide a transmit time interval (TTI) smaller than other services, and at the same time, design matters for allocating a wide resource in a frequency band may be required to secure the reliability of the communication link.

Three services of 5G, which are the eMBB, the URLLC, and the mMTC, may be multiplexed and transmitted in one system. Different transmission or reception techniques and transmission or reception parameters may be used between services in order to satisfy different requirements of respective services. 5G is not limited to the three services described above.

For convenience of description below, some terms and names defined in the 3GPP standard (standards of 5G, NR, LTE, or similar systems) may be used. However, the disclosure is not limited by the terms and names, and may be equally applied to systems conforming to other standards. Terms used for identifying an access node, terms indicating network entities, terms indicating messages, terms indicating interfaces between network entities, terms indicating various identification information, etc. used in the following description are illustrated for convenience of description. Therefore, the disclosure is not limited to the terms used herein, and other terms referring to objects having equivalent technical meanings may be used.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Figure 1C:
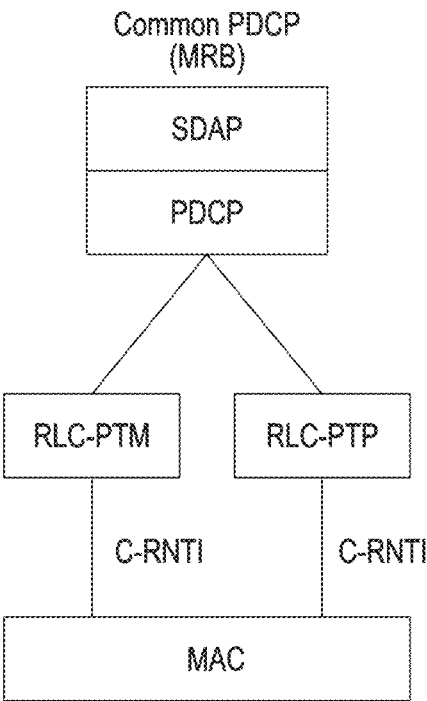

FIGS. 1A-1C depict an example architecture for a protocol stack for the UE implementation supporting the MBS services. Mainly, three types of radio bearer architecture are shown, and are as follows:

1. PTP RLC bearer based (PTP MRB)
2. PTM RLC bearer based (PTM MRB)
3. PTM+PTP RLC bearers based (MBS split bearer)

The RLC PTM is UM (Unacknowledged Mode) RLC, which does not support functionality of ARQ (Automatic Repeat Request) i.e., RLC level transmission are supported as there is no feedback or status report between the transmitting and sending RLC entities. RLC PTP can be either UM mode or AM (Acknowledged Mode) RLC. AM RLC supports status/feedback sharing from the receiver to the transmitter and retransmission of Nacked RLC packets from the transmitter to the receiver. Thereby, there is a further enhancement in the reliability that can be ensured with the AM RLC layer. Effectively, a lossless operation is achieved with utilizing AM RLC mode.

PDCP layer performs reordering operation and employs a reordering timer (t-Reordering) to ensure the out of order packets received from the RLC (or from two RLCs in MBS split bearer) are re-arranged in order of their sequence numbers(SN) before expiry of reordering timer t-Reordering. In case reordering timer expires, and there is still a gap with PDCP receive window (i.e., missing a PDCP PDU SN so that reordering, and in-sequence delivery could not be done to the higher layer), PDCP moves the receive window (i.e., update its state variable RX DELIV) further and performs the delivery of PDCP PDUs received until the window's lower edge, RX DELIV (the gap of missing PDCP PDU SN is also delivered).

Having an MBS split bearer with both PTM RLC and PTP RLC bearer adds to the reliability of the MBS bearer as lossless operation is achieved from the PTP path, whereas the PTM path provides the packet with lesser delay as no retransmission is involved albeit with possible loss. By combining these two paths through the PDCP reordering operation, there is higher chances of receiving PDCP PDUs before expiry of the t-Reordering and providing ordered in-sequence delivery to the higher layer.

The embodiments herein achieve methods and systems for resource allocation and operation for multicast/broadcast services in 5G networks. Referring now to the drawings, and more particularly to FIG. 2 to FIGS. 5C, where similar reference characters denote corresponding features consistently throughout the figures, there are shown at least one embodiment.

Figure 2:
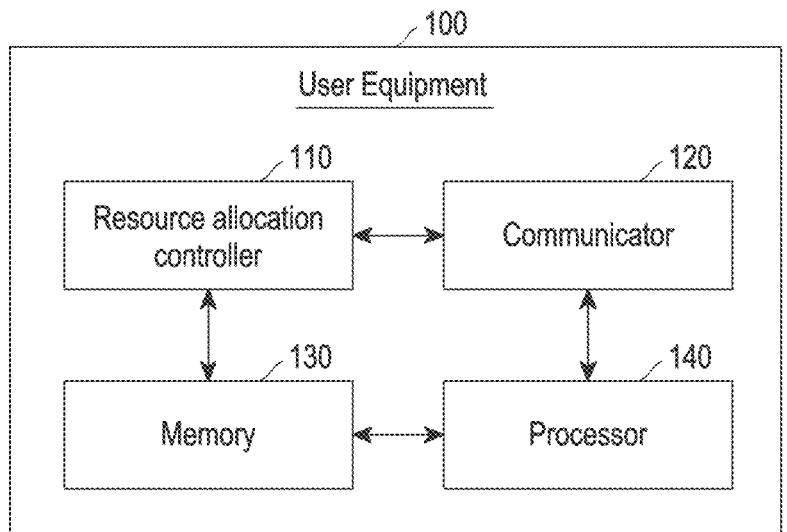
FIG. 2 shows various hardware components of the UE for allocating resources to multicast and broadcast services (MBS) in a network, according to embodiments as disclosed herein.

FIG. 2 shows various hardware components of the UE for allocating resources to multicast and broadcast services (MBS) in a network, according to embodiments as disclosed herein. The UE 100 includes a resource allocation controller 110, a communicator(e.g. a transceiver) 120, a memory 130, and a processor 140. In addition, the base station communicating with the UE may be configured to include a transceiver and a processor.

The resource allocation controller 110 can determine resource allocation for MBS over at least one MBS BWP (Bandwidth Part) or CFR (Common Frequency Resource) and association of an MBS BWP or CFR with a unicast BWP, wherein an MBS BWP or CFR can be one of fully confined within unicast BWP or partially overlapped with unicast BWP or separately spaced than that of unicast BWP. The resource allocation controller 110 is further configured, based on the determining an MBS BWP or CFR is fully confined within unicast BWP, to receive the MBS service on the MBS BWP or CFR within the activated unicast BWP in accordance with a Radio Resource Control (RRC) configuration, wherein if the unicast BWP is deactivated, then the resource allocation controller stops receiving the MBS services on the BWP and terminates the MBS services. The resource allocation controller 110 is further configured, based on the determining an MBS BWP or CFR is one of partially overlapped with unicast BWP or is separately spaced than that of unicast BWP, to receive the MBS service on the MBS BWP or CFR with at least one of switching dynamically between MBS BWP or CFR and unicast BWP and utilizing a plurality of receiver chains such as employing carrier aggregation across MBS BWP/CFR and unicast BWP.

The resource allocation controller 110 can further receive the unicast services, and the MBS services together from the network.

In some embodiments, the resource allocation for the at least one MBS BWP or CFR is provided in at least one of a Time Domain Resource allocation (TDRA) field and a Frequency Domain Resource Allocation (FDRA) field where in at least one of TDRA field and FDRA field for MBS is configured or preconfigured through at least one of RRC reconfiguration message or broadcasted message such as SIB (System Information Block) or MCCH (MBS Control Channel), and MBS resource allocation by at least one of TDRA field and FDRA field is dynamically indicated in the DCI (Downlink Control Information) signaling by PDCCH (Physical Downlink Control Channel). DCI is scrambled with G-RNTI for the pertinent MBS service.

In some embodiments, the resource allocation controller is configured to send a RRC connection request or a RRC Resume request to the network in order to continue receiving the MBS services and also includes indication for the MBS service and/or BWP/CFR information so as network configures the active downlink (DL) and/or uplink (UL) unicast BWP and/or MBS BWP or CFR suitably to support continuation of the MBS service reception for the UE in situation where the UE undertakes transition from idle mode or inactive mode to connected mode while receiving the MBS service in idle mode or inactive mode.

In some embodiments, the resource allocation controller is configured to maintain a BWP inactivity timer while receiving the MBS services wherein BWP inactivity timer is configured by network through RRC signaling. The resource allocation controller is further configured to start or restart the BWP inactivity timer on receiving a PDCCH addressed to G-RNTI (Group Radio Network Temporary Identifier)/ G-CS-RNTI (Group Configured Scheduled Radio Network Temporary Identifier) or C-RNTI (Cell Radio Network Temporary Identifier) indicating downlink assignment received on the MBS BWP or CFR or a MAC PDU is received in a configured downlink assignment for multicast.

In some embodiments, upon expiry of the BWP inactivity timer while receiving MBS services, the resource allocation controller is configured to perform one of BWP switching to a default downlink BWP, if the default downlink BWP is configured, or BWP switching to the initial downlink BWP.

In some embodiments, MBS-bwp-InactivityTimer is maintained for MBS service reception on MBS BWP or CFR. If a PDCCH addressed to G-RNTI/G-CS-RNTI or C-RNTI indicating downlink assignment received on the active MBS BWP or CFR or a MAC PDU is received in a configured downlink assignment for multicast, the resource allocation controller is configured to start or restart the MBS-bwp-InactivityTimer for MBS BWP or CFR associated with the active DL BWP. When both the bwp-InactivityTimer and MBS-bwp-InactivityTimer associated with the active DL BWP expire, the resource allocation controller is configured to perform BWP switching to a default downlink BWP, if the default downlink BWP is configured Otherwise, the resource allocation controller is configured to perform BWP switching to the initial downlink BWP.

In some embodiments if the MBS service reception is configured and/or activated and pertains to the MBS BWP or the MBS CFR within the unicast BWP then the resource allocation controller is configured to start receiving the MBS service on the activated MBS BWP or CFR within activated unicast BWP in accordance with a Radio Resource Control (RRC) configuration.

In some embodiments when the unicast BWP is deactivated, then the resource allocation controller is configured to perform at least one of: clearing configured downlink assignment and configured uplink grant of configured grant Type 2 pertaining to at least one of the unicast services or the MBS services on the BWP; and suspending configured uplink grant of configured grant Type 1 pertaining to at least one of the unicast services or the MBS services on the BWP.

In some embodiments, upon deactivation or dormancy of the unicast BWP, the resource allocation controller is configured to perform at least one of: stops receiving the MBS service on the MBS BWP/CFR associated with unicast BWP and terminates the MBS service; or switching switches the MBS service to one of the default BWP or an initial BWP.

In some embodiments, if the unicast BWP is re-activated, the MBS reception is switched back to the unicast BWP.

In some embodiments, if MBS service reception is configured and/or activated and pertains to the MBS BWP or CFR configured within the unicast BWP and unicast BWP is deactivated or made dormant and no uplink feedback is configured, the resource allocation controller is configured to continue receiving MBS service on the MBS BWP or CFR.

In some embodiments, if MBS service reception is for broadcast service and pertains to the MBS BWP or CFR configured within the unicast BWP and unicast BWP is deactivated or made dormant, UE continues receiving MBS service on the MBS BWP or CFR.

Further, the processor 140 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

At least one of the plurality of modules may be implemented through the AI model. A function associated with AI may be performed through the non-volatile memory, the volatile memory, and the processor 140. The processor 140 may include one or a plurality of processors. At the time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may include of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the UE 100, but it is to be understood that other embodiments are not limited thereon. In other embodiments, the UE 100 may include less or a greater number of components. Further, the labels or names of the components are used only for illustrative purpose and does not limit the scope of the invention. One or more components can be combined together to perform same or substantially similar function in the UE 100.

FIGS. 3A through 3F depict a plurality of configuration modes or alternatives for the MBS BWP and/or common MBS CFRs. For example, consider the first mode as 'X', the second mode as 'Y', and a third mode as Y1. . . . Yn.

Figure 3A:
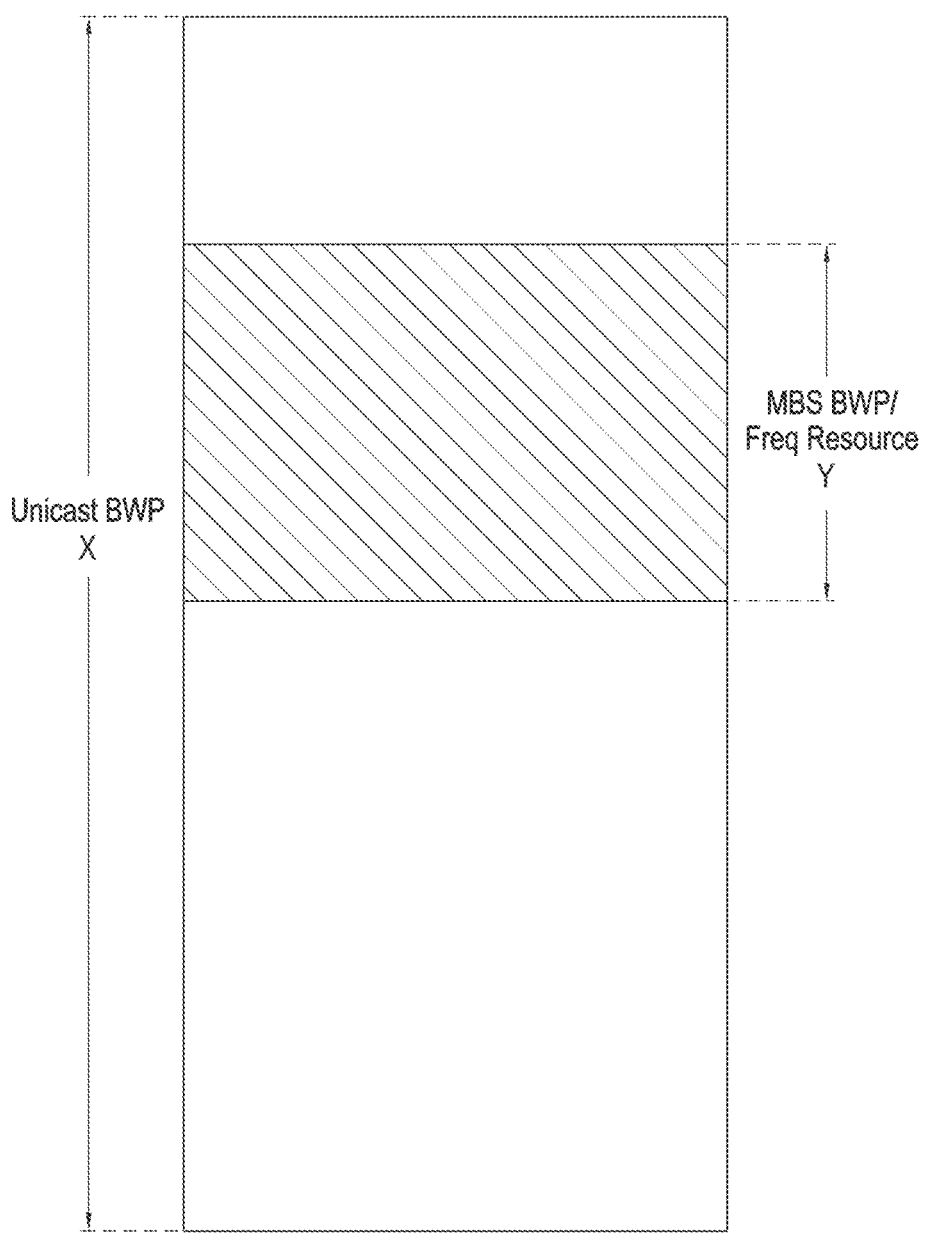
FIGS. 3A, 3B, 3C, 3D, 3E, 3F, 3G through 3H depict a plurality of configuration modes or alternatives for the MBS BWP and/or MBS CFRs, according to embodiments as disclosed herein.

Case 1: As depicted in FIG. 3A, the MBS BWP or MBS CFR 'Y' is confined within the unicast BWP 'X', such that X>Y. In the PDCCH configuration, there is no need to do BWP switching across the unicast services and the MBS and thereby, there is no switching delay. The UE 100 can receive the unicast services and MBS services together. The MBS BWP or MBS CFR is statically or dynamically allocated.

Figure 3B:
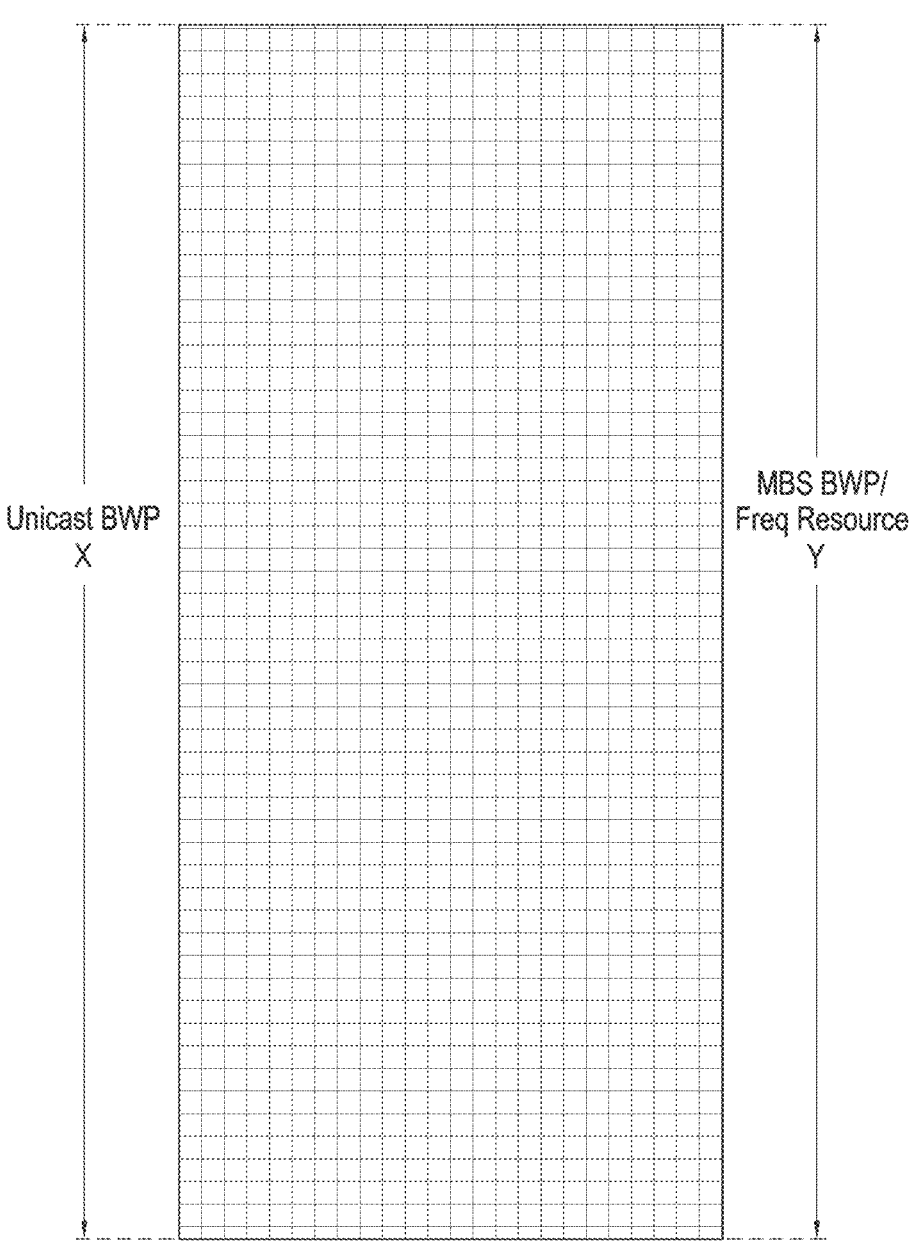

Case 2: As depicted in FIG. 3B, MBS BWP or MBS CFR 'Y' is confined within the unicast BWP 'X', such that X=Y. In the PDCCH configuration, there is no need to do BWP switching across unicast and MBS and thereby, there is no switching delay. The UE 100 can receive the unicast and MBS services together.

Figure 3C:
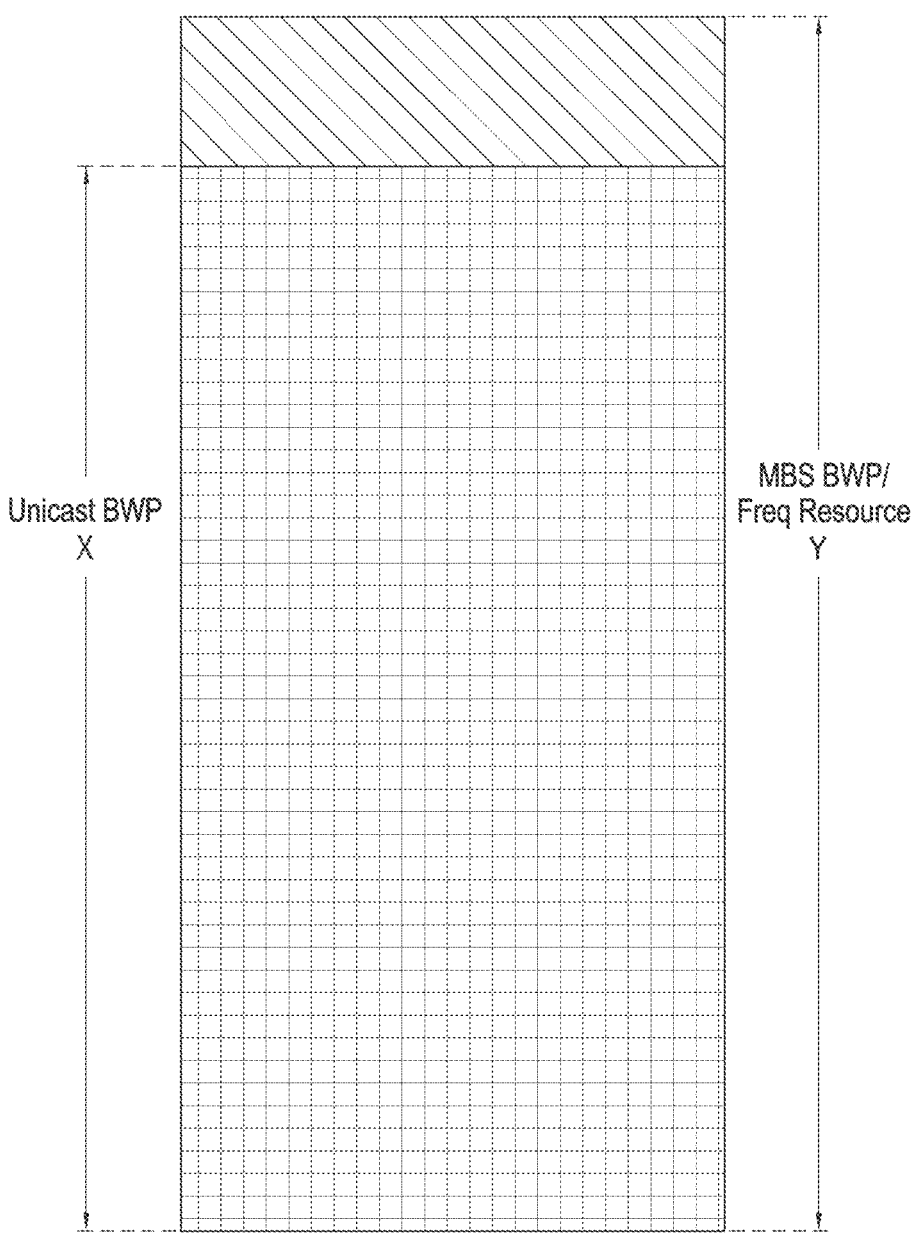

Case 3: As depicted in FIG. 3C, the MBS BWP or MBS CFR 'Y' also extends beyond the unicast BWP 'X', such that X<Y. The UE 100 can receive the unicast services and the MBS services together, provided the UE 100 dynamically switches between the MBS BWP or MBS CFR and the unicast BWP or utilizes two different reception paths or utilizes carrier aggregation.

Figure 3D:
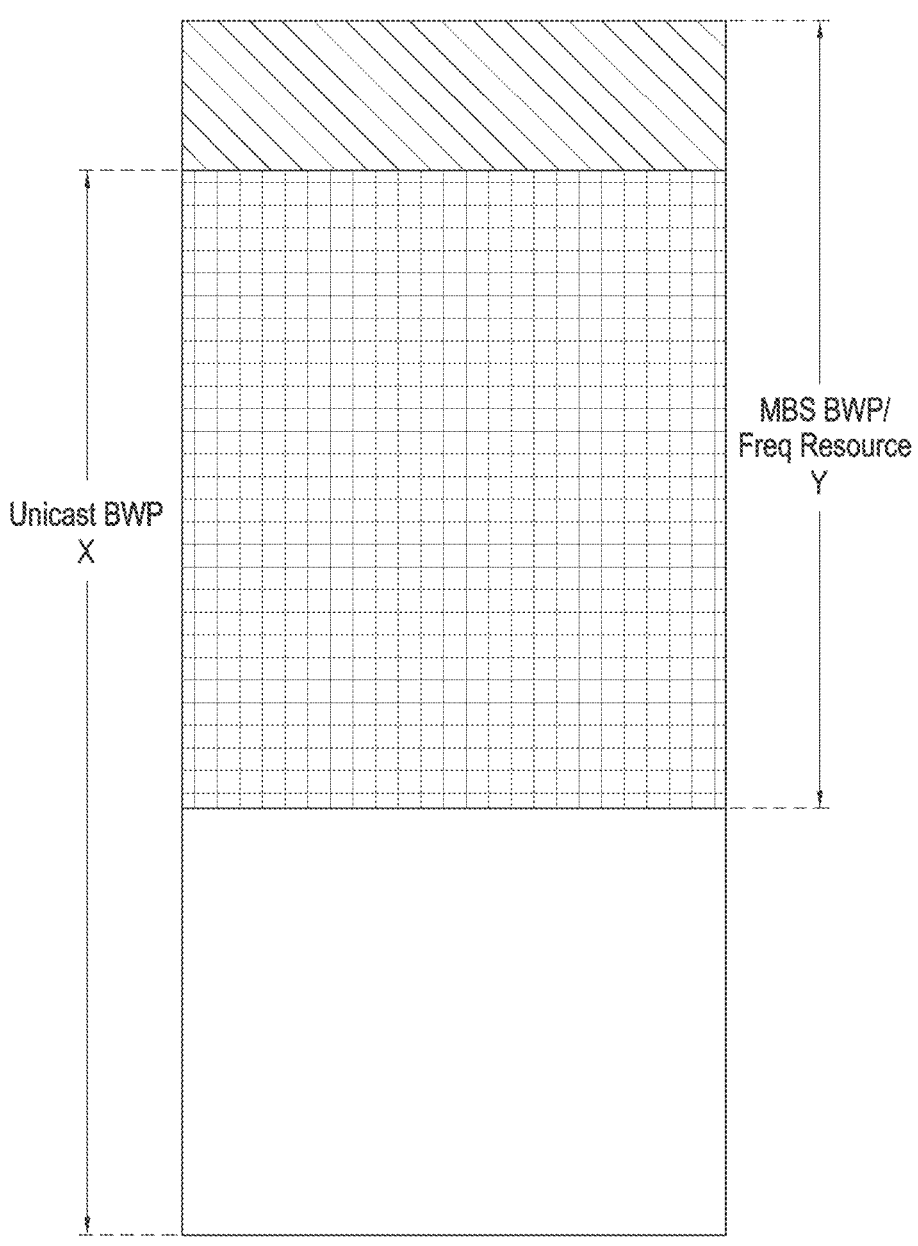

Case 4: As depicted in FIG. 3D, MBS BWP or MBS CFR 'Y' is not completely confined within the unicast BWP 'X'. There is a start offset for MBS BWP or MBS CFR with respect to the unicast BWP.

All three cases for X>Y, X=Y and X<Y are possible. The UE 100 can receive the unicast services and MBS services together provided, the UE 100 dynamically switches between the MBS BWP or MBS CFR and the unicast BWP or utilizes two different reception paths or utilize carrier aggregation.

Figure 3E:
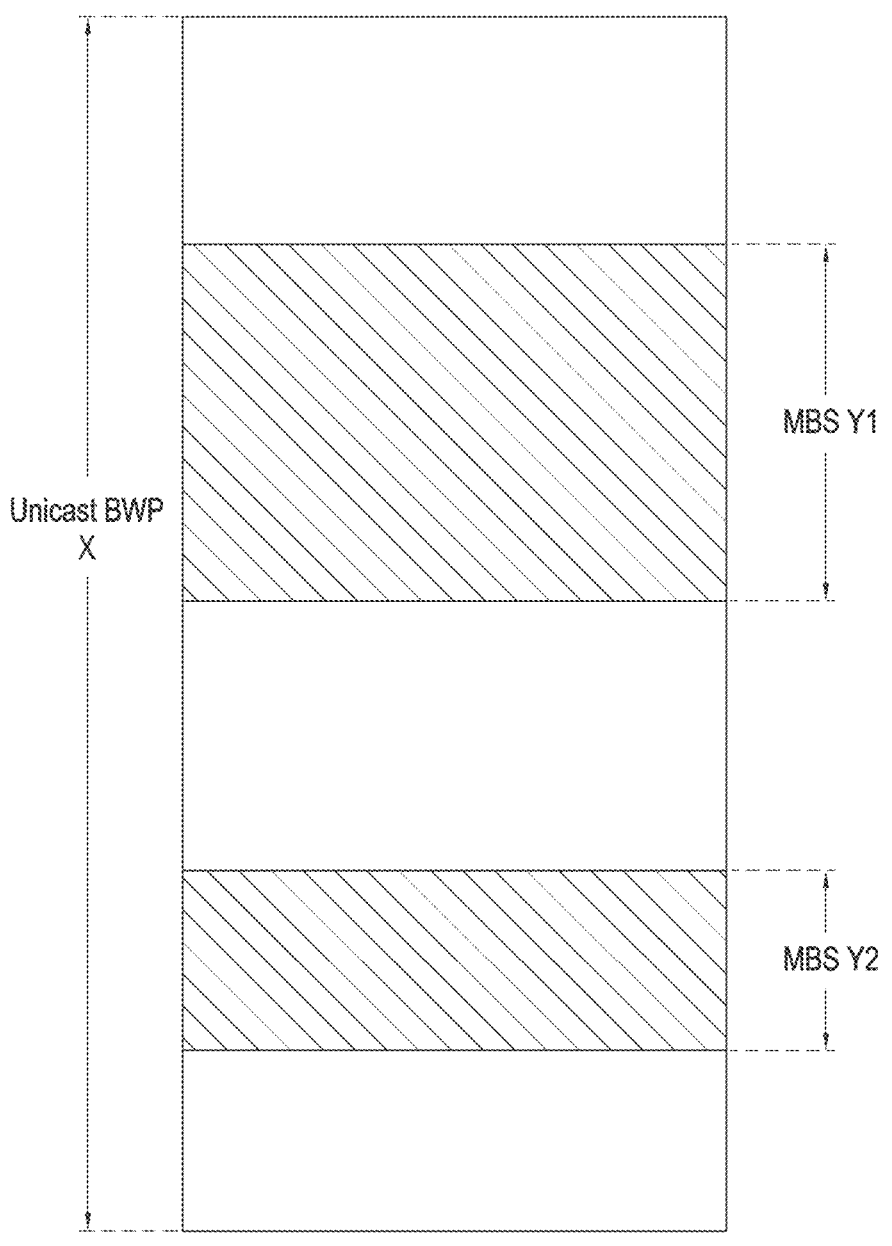

Case 5: As depicted in FIG. 3E, MBS BWP(s) or MBS CFRs 'Y1', 'Y2',?'Yn' are confined within the unicast BWP 'X' such that X>Y1, X>Y2, . . . , X>Yn. In the PDCCH configuration, there is no need to do BWP switching across the unicast services and MBS and thereby, there is no switching delay. The UE 100 can receive the unicast and MBS services together. The MBS BWP or MBS CFR Y1, Y2, . . . ,Yn are statically or dynamically allocated.

Figure 3F:
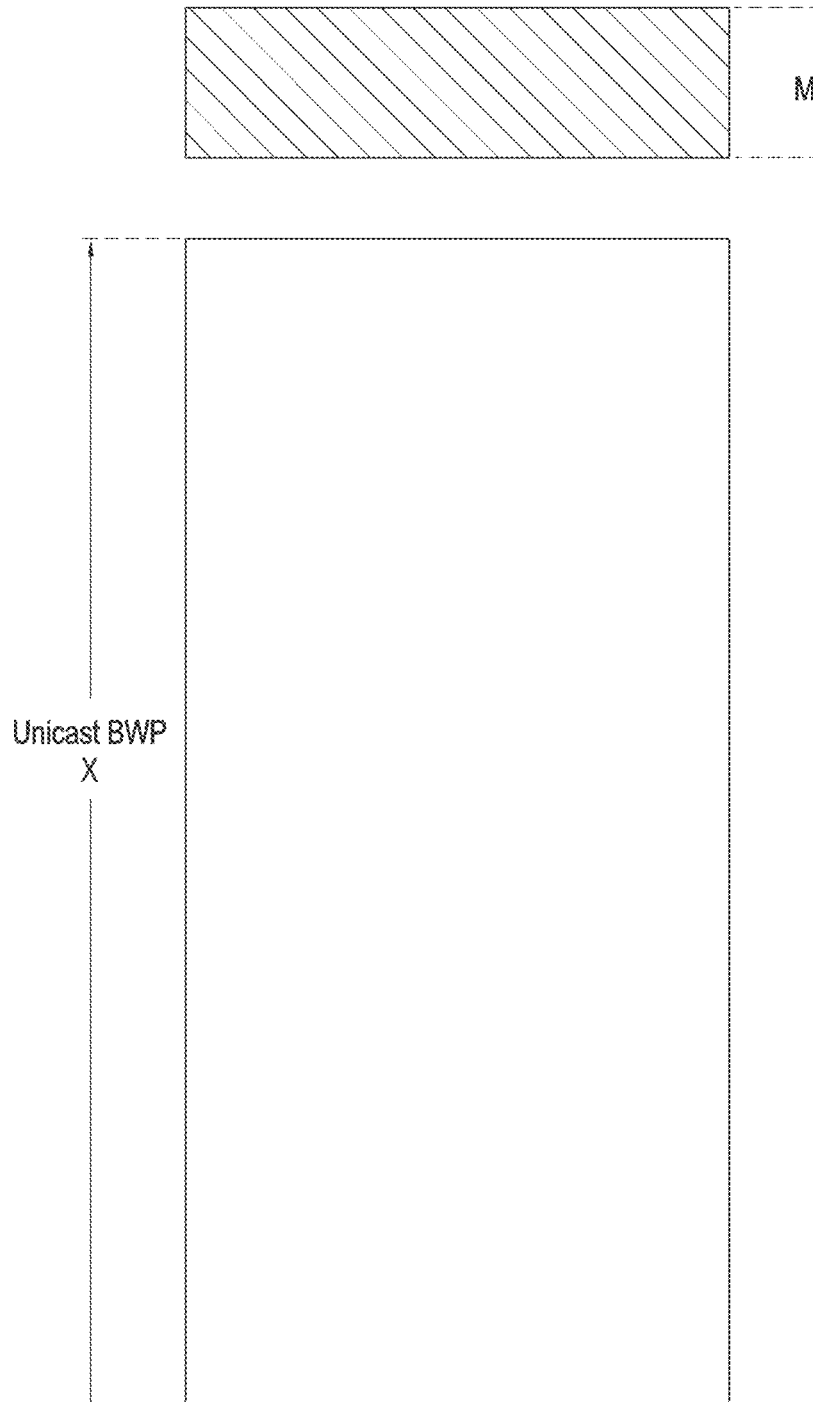

Case 6: As shown in FIG. 3F, MBS BWP or MBS CFR 'Z' is not completely different from the unicast BWP X. All three cases for X>Y, X=Y and X<Y are possible. Therefore, there is BWP switching involved. The UE 100 can receive the unicast services and MBS services together, provided the UE 100 dynamically switches between MBS BWP or MBS CFR and the unicast BWP or utilizes two different reception paths or utilizes carrier aggregation.

Case 7: Static MBS configuration in BWP might restrict flexibility scheduling of MBS and unicast resources, therefore, dynamic/semi-static MBS frequency allocation may be provisioned within BWP. Dynamic or semi static "sub BWP (MBS)" could be configured by RRC signaling and MAC-CE or PDCCH indication could be used to activate or deactivate a configuration.

Figure 3G:
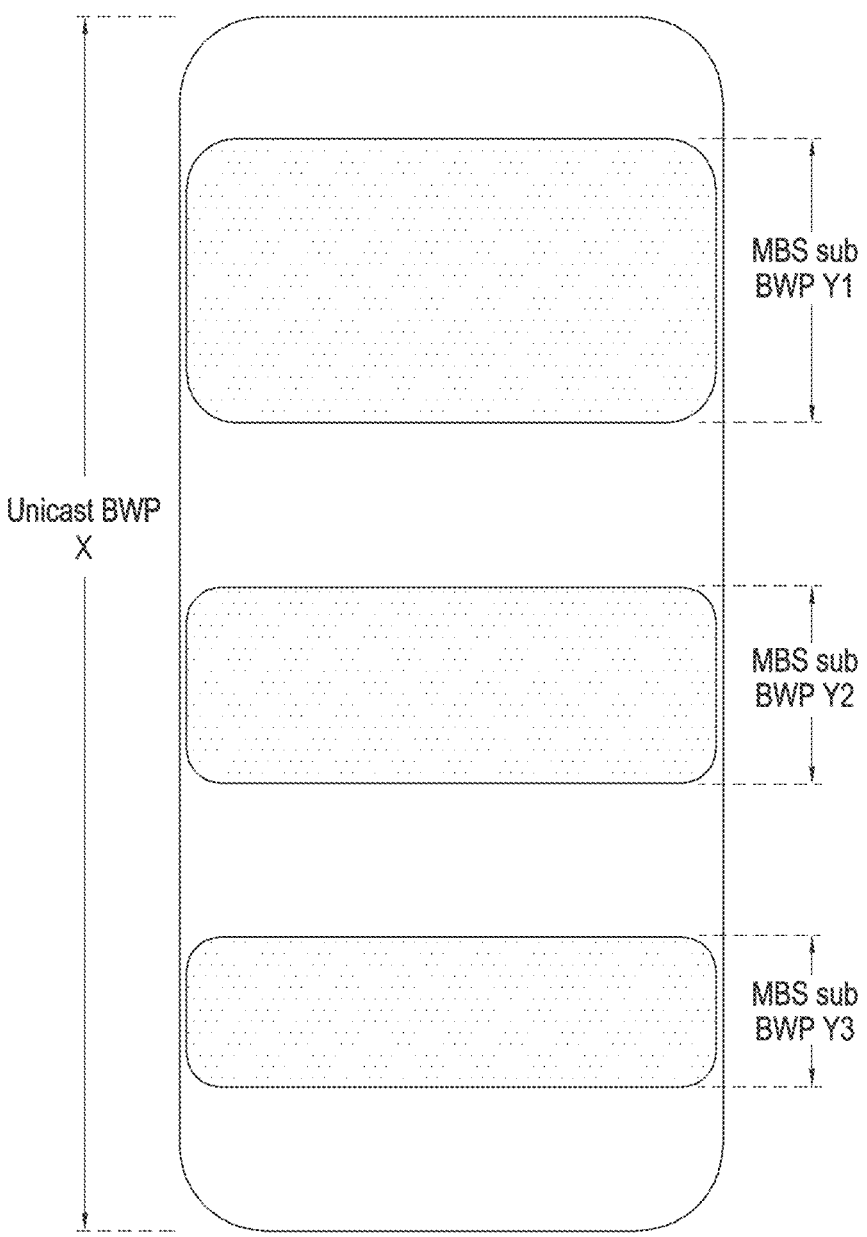

Case 7.1: Dynamic or semi static configuration with change in "sub BWP" within BWP will also add flexibility in managing resources as per channel condition and geographical area to minimize interference in MBS resources (as depicted in FIG. 3G).

Figure 3H:
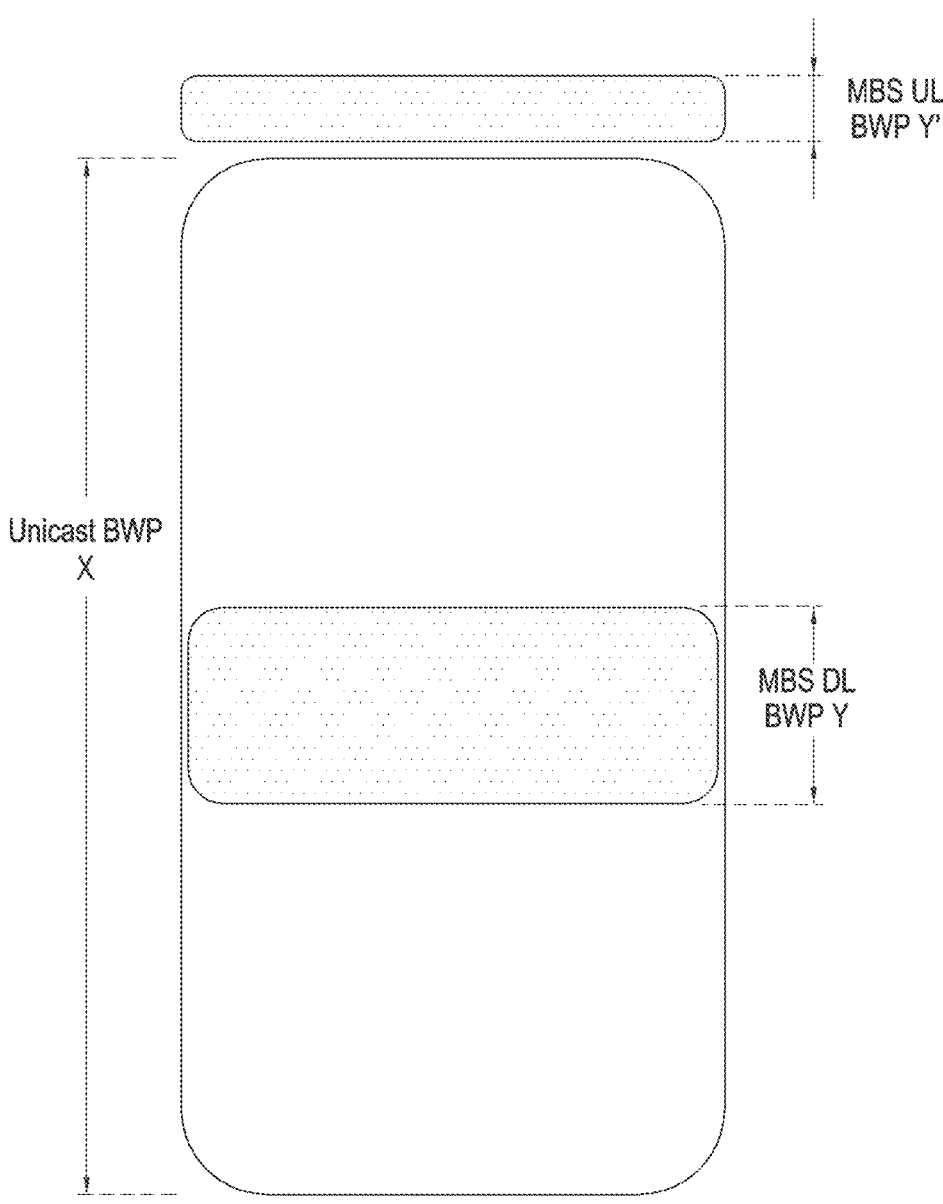

Case 7.2: In the configuration mode, an MBS uplink (UL) BWP Y' is shown along with the MBS downlink (DL) BWP Y. In an example, the MBS UL BWP Y' may be located outside a unicast DL BWP (as depicted in FIG. 3H).

Mapping of the BWP/MBS CFRs to Different Uses Cases and Channels for the MBS Services Embodiments herein disclose the mapping of the unicast BWP and the MBS BWP or MBS CFRs to different use cases, states/modes of operations and usage of physical channels for the purpose of MBS services.

Unicast BWP:

Mapped for unicast services delivery.

Mapped for the individual traffic delivery of MBS services (PDU sessions). Control channel PDCCH is addressed by C-RNTI of the UE 100. MBS service data is mapped to the UE 100 specific PDSCH.

Mapped for the shared traffic delivery of MBS services for PTP mode of delivery by the gNB. Control channel PDCCH is addressed by C-RNTI of the UE 100. MBS service data is mapped to the UE 100 specific PDSCH.

Mapped for the shared traffic delivery of MBS services for PTM mode of delivery by the gNB. Control channel PDCCH is addressed by C-RNTI of the UE 100 in the unicast BWP. MBS service data is mapped to the group common PDSCH in the MBS BWP or MBS CFR. This may be used for the connected only mode multicast and connected only mode broadcast services which may require higher reliability or QoS.

Mapped for the connected only mode for multicast and connected only mode for broadcast services which may require higher reliability or QoS.

Mapped for the HARQ feedback, CSI feedback, measurement reporting, the UE assistance information or other uplink signaling/messaging for unicast services and/or individual MBS traffic delivery and/or PTP MBS delivery mode over unicast BWP and/or PTM MBS traffic delivery over MBS BWP or MBS CFRs. These are carried over uplink physical channels like PUCCH or PUSCH on the unicast BWP.

MBS BWP or MBS CFR:

Mapped for the shared traffic delivery of MBS services for PTM mode of delivery by the gNB. Control channel PDCCH is addressed by G-RNTI/G-CS-RNTI of the UE 100. MBS service data is mapped to the group common PDSCH. This may be used for the connected only mode multicast and connected only mode broadcast services, which may require higher reliability or QoS. This may be used for the connected/idle/inactive modes for broadcast services, or connected/idle/inactive modes for multicast services, which do not require high reliability or QoS and would be received by different UEs in idle or inactive or connected modes.

Mapped for the shared traffic delivery of MBS services for PTM mode of delivery by the gNB. Control channel PDCCH is addressed by C-RNTI of the UE 100. MBS service data is mapped to the group common PDSCH. This may be used for the connected only mode multicast and connected only mode broadcast services, which may require higher reliability or QoS.

Mapped for the HARQ feedback, CSI feedback, measurement reporting, UE assistance information or other uplink signaling/messaging for PTM MBS traffic delivery over MBS BWP or MBS CFRs. These are carried over uplink physical channels like PUCCH or PUSCH on the MBS BWP/MBS CFR.

In an embodiment herein, the HARQ feedback, CSI feedback, measurement reporting, the UE assistance information or other uplink signaling/messaging pertaining to MBS services are carried over uplink physical channels like PUCCH or PUSCH that mapped to one of the following:

Mapped to unicast uplink BWP and the UE 100 exclusively uses a UE specific PDCCH on unicast BWP with UE specific PDSCH on unicast BWP.

Mapped to unicast uplink BWP and the UE 100 exclusively uses the UE specific PDCCH on unicast BWP with group common PDSCH on MBS BWP or MBS CFR.

Mapped to MBS uplink BWP/MBS CFR which may or may not be same as (downlink) MBS BWP or MBS CFR over which the UE 100 receives the PTM MBS services, and the UE 100 exclusively uses the UE specific PDCCH on unicast BWP with group common PDSCH on MBS BWP or MBS CFR.

Mapped to MBS uplink BWP/MBS CFR which may or may not be same as (downlink) MBS BWP or MBS CFR over which the UE 100 receives the PTM MBS services, and the UE 100 exclusively uses a group common PDCCH on MBS BWP/MBS CFR with group common PDSCH on MBS BWP or MBS CFR.

Mapped to MBS uplink BWP/MBS CFR which may or may not be same as (downlink) MBS BWP or MBS CFR over which the UE receives the PTM MBS services, and the UE 100 exclusively uses the UE specific PDCCH on MBS BWP/MBS CFR with group common PDSCH on MBS BWP or MBS CFR.

In an embodiment herein, the resource allocation for the MBS BWP or MBS CFR are provided in the TDRA (Time Domain Resource allocation) and/or FDRA (Frequency Domain Resource Allocation) fields in the DCI (Downlink Control Information) fields in the PDCCH. The PDCCH may pertain to UE-specific PDCCH carried over unicast BWP or CORESET and/or UE-specific or group-common PDCCH carried over MBS BWP or MBS CFR or CORE-SET. Different TDRA/FDRA combinations for the resources can also be pre-configured utilizing the RRC reconfiguration message and/or broadcasted message like SIB or MCCH and only TDRA/FDRA index fields are provided in the PDCCH on run-time and/or dynamically. The information conveyed in TDRA includes at least one of the starting slot/symbol, offset, duration or length of allocation and/or ending slot/symbol. The information conveyed in FDRA includes at least one of the starting physical resource block (PRB), offset, length of PRB allocation and/or ending PRB, BWP or MBS CFR size. DCI carrying TDRA and/or FDRA is scrambled with G-RNTI or G-CS-RNTI for the pertinent MBS service.

Transition Across PTM/PTP/Unicast and Idle/Inactive/Connected and BWP/MBS CFRs

As in 3GPP 38.321, the BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure or upon detection of consistent LBT (Listen Before Talk) failure on SpCell. Upon RRC (re-)configuration of firstActiveDownlinkBWP-Id and/or firstActiveUplinkBWP-Id for SpCell or activation of an SCell, the DL BWP and/or UL BWP (indicated by firstActiveDownlinkBWP-Id and/or firstActiveUplinkBWP-Id respectively) is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL.

For each SCell, a dormant BWP may be configured with dormantDownlinkBWP-Id by RRC signaling. Entering or leaving dormant BWP for SCells can be done by BWP switching per SCell. Entering or leaving dormant BWP for SCells can be done per dormancy SCell group based on instruction from PDCCH. The dormancy SCell group configurations can be configured by RRC signaling. Upon reception of the PDCCH indicating leaving dormant BWP, the DL BWP indicated by firstOutsideActiveTimeBWP-Id or firstWithinActiveTimeBWP-Id is activated. Upon reception of the PDCCH indicating entering dormant BWP, the DL BWP indicated by dormantDownlinkBWP-Id is activated.

Embodiments herein disclose a plurality of scenarios and approaches to address the BWP switching and state/mode transitions in conjunction with receiving MBS services.

In an embodiment herein, for each activated serving cell configured with a unicast BWP and the UE 100 is configured and/or activated for reception of MBS service(s) on the activated unicast BWP, the UE starts receiving MBS service on the activated BWP, in accordance with the RRC configuration and/or broadcasted configuration. The MBS service may correspond to either MBS service received in unicast mode or PTP mode of reception. PDCCH is addressed with the UE specific C-RNTI. MBS contents are received over UE specific PDSCH. Further, PTM mode of reception for MBS services over the MBS BWP or MBS CFRs may be confined in the activated unicast BWP. Therefore, MBS services, which require uplink feedback transmission on the unicast uplink physical channels, can also be received. HARQ feedback, CSI feedback, measurement reporting, UE assistance information or other uplink signaling/messaging for unicast services and/or individual MBS traffic delivery and/or PTP MBS delivery mode over unicast BWP. These are carried over uplink physical channels like PUCCH or PUSCH on the unicast uplink BWP. Choice of target BWP should be Max (Unicast, MBS) services; i.e., selection of BWP should be based on maximum requirement of MBS or unicast.

For each activated serving cell configured with a BWP, the MAC entity shall:

1> if a BWP is activated and the active DL BWP for the Serving Cell is not the dormant BWP:

2>transmit on UL-SCH on the BWP;

2>transmit on RACH on the BWP, if PRACH occasions are configured;

2>monitor the PDCCH on the BWP;

2>transmit PUCCH on the BWP, if configured;

2>report CSI for the BWP;

2>transmit SRS on the BWP, if configured;

2>receive DL-SCH on the BWP;

2> if MBS service reception is configured and/or activated and pertains to the activated BWP or MBS sub BWP within unicast BWP:

3> start receiving MBS service on the activated BWP or MBS sub BWP within unicast BWP in accordance with RRC configuration.

2>(re-)initialize any suspended configured uplink grants of configured grant Type 1 on the active BWP according to the stored configuration, if any, and to start in the symbol according to rules in clause 5.8.2;

2> if consistent LBT failure recovery is configured:

3>stop the lbt-FailureDetectionTimer, if running;

3> set LBT COUNTER to 0;

3>monitor LBT failure indications from lower layers as specified in clause 5.21.2.

In an embodiment herein, the UE 100 informs the network about the MBS service stoppage, which can be due to unicast BWP deactivation/dormancy and/or serving cell deactivation by signaling on the new activated unicast BWP and/or activated serving cell and possibly. In response, the UE 100 receives a new configuration for MBS service from the network to continue the MBS services.

Alternatively, the UE 100 switches to PTM mode of reception from PTP or unicast mode and continues receiving MBS service over MBS BWP or MBS CFR.

Alternatively, the UE 100 switches to PTM mode with group-common PDCCH addressed by G-RNTI/G-CS-RNTI on MBS BWP/MBS CFR from PTM mode with UE specific PDCCH addressed by C-RNTI/CS-RNTI on unicast BWP. The UE 100 may also switch from uplink physical channels PUCCH or PUSCH mapped to unicast BWP to uplink physical channels PUCCH or PUSCH mapped to MBS BWP/MBS CFR.

The UE 100 avails MBS service on the new activated DL BWP, if it is available or provided on request. In another embodiment herein, as soon as unicast BWP is deactivated, the UE 100 can be configured to default BWP in connected/idle/inactive mode for MBS reception. In addition, if unicast BWP is re-activated, MBS reception can switch back to unicast BWP.

1> if a BWP is activated and the active DL BWP for the serving Cell is dormant BWP:

2>stop the bwp-InactivityTimer of the serving Cell, if running.

2>not monitor the PDCCH on the BWP;

2>not monitor the PDCCH for the BWP;

2>not receive DL-SCH on the BWP;

2> perform periodic or semi-persistent CSI measurement for the BWP, if configured;

2>not transmit SRS on the BWP;

2>not transmit on UL-SCH on the BWP;

2>not transmit PUCCH on the BWP.

2>clear any configured downlink assignment and any configured uplink grant Type 2 associated with the SCell respectively;

2>suspend any configured uplink grant Type 1 associated with the SCell;

2> if configured, perform beam failure detection and beam failure recovery for the SCell if beam failure is detected.

2> if MBS service reception was configured and/or activated and pertains to the BWP:

3>stop receiving MBS service on the BWP and terminate the service

Alternatively, MBS service may be switched to default BWP in idle/inactive mode. MBS service may be switched to default MBS DL BWP in connected mode with associated configured/active MBS UL BWP for sending feedback as shown in FIG. 3H.

If the MBS services are received on the BWP, then the UE 100 does not consider BWP as dormant and continues monitoring PDCCH, and perform semi persistent CSI measurement for the BWP.

1> if a BWP is deactivated, and/or due to cross BWP monitoring PDCCH/feedback-drx timing issue, activation/deactivation timers, BWP timer and operations, delay or gap during the BWP switching, transit from PTP to PTM:

2>not transmit on UL-SCH on the BWP;

2>not transmit on RACH on the BWP;

2>not monitor the PDCCH on the BWP;

2>not transmit PUCCH on the BWP;

2>not report CSI for the BWP;

2>not transmit SRS on the BWP;

2>not receive DL-SCH on the BWP;

2>clear any configured downlink assignment and configured uplink grant of configured grant Type 2 on the BWP;

2>suspend any configured uplink grant of configured grant Type 1 on the inactive BWP.

2> if MBS service reception was configured and/or activated and pertains to the BWP:

3>stop receiving MBS service on the BWP and terminate the service

In another embodiment herein, MBS service could be switched to default BWP in idle/inactive mode. The MBS service could be switched to default MBS DL BWP in connected mode with associated configured/active MBS UL BWP for sending feedback as shown in FIG. 3H.

In an embodiment herein, the UE 100 continues MBS service reception in spite of the unicast BWP deactivation/dormancy and/or serving cell deactivation, if no uplink feedback is configured for MBS services, or if uplink feedback is configured for MBS services, the UE 100 does not provide feedback, but avails receiving HARQ retransmissions for MBS services.

The UE 100 stops/terminates the MBS service, if uplink feedback has been configured, or new unicast BWP has been activated providing MBS services, or new unicast BWP has been configured, and the UE 100 is not able to operate unicast and MBS services together.

The UE 100 informs the network by signaling on the new activated unicast BWP and possibly, receive a new configuration for MBS service from the network, to continue the MBS services.

The UE 100 switches MBS BWP or MBS CFR to the MBS BWP or MBS CFR, that is associated with the new activated unicast BWP and/or configured by the network and avails/continues MBS services.

In an embodiment herein, the UE 100 continues MBS service reception in spite of the unicast BWP deactivation/dormancy and/or serving cell deactivation, even when uplink feedback is configured for MBS services, by switching uplink feedback to the uplink physical channels like PUCCH or PUSCH mapped over the MBS BWP or MBS CFR.

Alternatively, MBS service could be switched to default BWP in idle/inactive mode. The MBS service could be switched to default MBS DL BWP in connected mode with associated configured/active MBS UL BWP for sending feedback as shown in FIG. 3H.

1> if a BWP is deactivated:

2>not transmit on UL-SCH on the BWP;

2>not transmit on RACH on the BWP;

2>not monitor the PDCCH on the BWP;

2>not transmit PUCCH on the BWP;

2>not report CSI for the BWP;

2>not transmit SRS on the BWP;

2>not receive DL-SCH on the BWP;

2>clear any configured downlink assignment and configured uplink grant of configured grant Type 2 on the BWP;

2>suspend any configured uplink grant of configured grant Type 1 on the inactive BWP.

2> if MBS service reception was configured and/or activated and pertains to the MBS BWP or MBS CFRs which are confined within the unicast BWP and no uplink feedback is configured; or 2> if MBS service reception is for broadcast MBS and pertains to the MBS BWP or MBS CFRs which are confined within the unicast BWP:

3>Continue receiving MBS service on the MBS BWP/MBS CFR

3>Continue monitoring the PDCCH on the MBS BWP/MBS CFRs

3>Continue receiving DL-SCH for the group-common PDSCH for the MBS service on the MBS BWP/MBS CFR.

MBS BWP Switching when Receiving Unicast Services

In an embodiment herein, the UE 100 receives RRC reconfiguration or broadcast message, e.g., SIB or MCCH that provides modified configuration for the PTM service, e.g., change in MBS BWP or MBS CFR and/or other parameters or MAC CE based signaling causing switch of the MBS BWP or MBS CFR for the PTM service, which the UE 100 is availing. In the scenario, the UE 100 performs reconfiguration and/or MBS BWP or MBS CFR switching to the new BWP or MBS CFR associated with the same or different unicast BWP. During the reconfiguring, the UE 100 runs an MBS-bwpSwitchTimer and during which the UE 100 does not receive MBS transmission pertaining to the MBS BWP or MBS CFR which is affected. The timer value may also depend on the sub-carrier spacing (SCS), BWP, MBS CFR, frequency range (e.g., FR1 which is sub-6 GHz or FR2 which is above 6 GHz) and/or other parameters. In case, the UE 100 is involved with a split MBS bearer with both PTM and PTP legs, and due to an interruption, only the PTM reception is affected, the UE 100 continues receiving on the PTP leg during the interruption for MBS BWP or MBS CFR switching. Further, if there are HARQ feedbacks are carried on PTP (which are pertaining to PTM reception by the UE 100), the absence of HARQ feedbacks on PTP during interruption time of PTM are not considered as DTX or NACK and are not considered for retransmissions. In another embodiment, if the uplink feedback were mapped to uplink physical channels like PUCCH or PUSCH over MBS BWP/MBS CFR are mapped to uplink physical channel over unicast BWP.

In an embodiment herein, where the current BWP is not sufficient for MBS services, while being sufficient for unicast services, the UE 100 should be configured for wider BWP (considering MBS services), wherein the BWP configuration can be MAX (MBS, Unicast).

In an embodiment herein, certain low QoS services can be received in multicast and/or broadcast delivery modes by UEs which may be in idle, inactive or connected states. These services are typically low QoS related and do not require HARQ or ARQ retransmissions and therefore suitable to be received in any RRC state. For example, UEs which are already connected for unicast services can receive these services in connected mode, whereas the UEs which are in idle or inactive mode (or UEs, which can move into in idle or inactive modes) can also receive these services and have better battery performance. Two alternatives can be considered for reception of these low QoS services by UEs in different RRC states:

1. MBS services are delivered in PTM mode, which are using MBS BWP or MBS CFR and are shared across connected mode active BWP and idle/inactive mode initial and/or default BWP.

2. MBS services are delivered in PTM mode, which are using MBS BWP or MBS CFR which are different for connected mode active BWP, default MBS BWP in connected mode and idle/inactive mode initial and/or default BWP. When the UE 100 switches the RRC state, the UE 100 also moves across the between connected active BWP, default MBS BWP in connected mode and idle/inactive mode initial/default BWP. Signaling and control information (like SIB, MCCH, paging for PTM UEs, and so on) is also transmitted in the respective BWP or MBS CFR. Further, the service information for the PTM services carry both the configuration for connected and idle/inactive mode BWP or MBS CFR information in the broadcasted signaling (like SIB or MCCH or RRC reconfiguration message), so that the UE 100 can avail PTM service in respective RRC state and transition across RRC states and continue receiving MBS service after reconfiguring suitably.

The UE 100 undertakes transition from connected mode to idle or inactive mode when one of the following events are encountered:

RRCRelease message reception: The UE 100 transits to idle mode. The UE 100 continues reception of the MBS service in idle mode.

Serving cell deactivation: the UE 100 transits to idle/inactive mode. The UE 100 continues reception of the MBS service in idle/inactive mode.

Unicast BWP deactivation: The UE 100 transits to idle/inactive mode. The UE 100 continues reception of the MBS service in idle/inactive mode initial and/or default BWP MBS BWP or MBS CFR deactivation: The UE 100 transits to idle/inactive mode. The UE 100 continues reception of the MBS service in idle/inactive mode initial and/or default BWP DataInactivityTimer expiry for unicast reception: When DataInactivity timer for unicast reception expires, the UE 100 releases the RRC connection and transits to idle mode. The UE 100 continues reception of the MBS service in idle mode.

DataInactivityTimer expiry when receiving MBS over Unicast BWP: The UE 100 operates additional MBS-DataInactivityTimer, apart from Unicast DataInactivityTimer, or operates a single timer for DataInactivityTimer for both MBS and unicast traffic packet. When these two timers or the single timer expires, the UE 100 takes transition to the idle mode. The UE 100 continues reception of the MBS service in idle mode.

DataInactivityTimer expiry when receiving MBS over MBS BWP or MBS CFR. UE maintains an MBS-DataInactivity timer and on expiry of the timer (when no MBS service packet is received for the stipulated time of the MBS-DataInactivityTimer). The UE 100 transits to the idle/inactive mode if no other unicast service is being received or unicast DataInactivityTimer has also expired or not running. In other words, if datainactivity timer expires for unicast service and MBS datainactivityTimer is ongoing, then the UE 100 would stay in connected mode to receive MBS services with connected mode MBS defaultBWP. Alternatively, the UE 100 need not attempt to continue reception of MBS service in idle/inactive mode. In case, the UE 100 is informed about availability/re-start of MBS service or paging/group-paging or broadcast information about the MBS service, the UE 100 initiates to receive the MBS service in idle/inactive mode and/or transits to connected mode.

If no unicast service being received and data inactivity time has expired, while MBS services still continue, the UE 100 could move to default MBS-BWP in connected mode and deactivate UE specific BWP or alternatively, the UE 100 could move to idle/inactive mode and receive MBS services on initial or default BWP.

RRCRelease with Suspend configuration: the UE 100 transits to the inactive mode and the UE 100 continues reception of the MBS service in inactive mode.

RRCRelease with Redirection: the UE 100 performs reselection to the redirected frequency or cell and the UE 100 continues reception of the MBS service in idle mode.

The UE 100 undertakes transition from idle or inactive mode to connected mode while already receiving MBS service in idle or inactive mode due to UL or DL data arrival or Service request or TAU/RAN update or other signaling etc. The UE 100 initiates sending of RRC connection request or RRCResume request and also includes an indication for the MBS service or BWP/MBS CFR information so that the network configures the active DL and/or UL unicast BWP and/or MBS BWP/MBS CFR suitably to support continuation of the MBS service reception for the UE 100.

Switching Between PTM and PTP Delivery Modes

In an embodiment herein, the UE 100 switches between PTM and PTP delivery modes when it is signaled by the gNB, e.g., through RRC reconfiguration or MAC CE. To achieve that the UE 100 also switches across the MBS BWP/MBS CFR and the unicast BWP.

HARQ feedback, when supported, for both PTM services being received on the MBS BWP or MBS CFR in downlink or PTP services being received in unicast BWP in downlink are carried over unicast uplink BWP by PUCCH or PUCCH physical channel to the gNB. A mapping or identification associated with the HARQ feedback is present to notify whether it is pertaining to PTM or PTP path; for example, C-RNTI/G-RNTI/G-CS-RNTI/LCID/TMGI and/or PTM/ PTP type, BWP/MBS CFR type, configuration Id, HARQ process Id etc., can be used for identification. When it is PTP only bearer or PTP only bearer or PTP+PTM split MBS bearer, the number of feedback and identification are carried.

If the UE 100 was involved with a split MBS bearer with both PTM and PTP legs, and due to interruption PTM reception only is affected, the UE 100 continues receiving on the PTP leg during the interruption for MBS BWP or MBS CFR switching. Further, if there are HARQ feedbacks that are carried on PTP which are pertaining to PTM reception by the UE 100, the absence of HARQ feedbacks on PTP during interruption time of PTM are not considered as DTX or NACK and are not considered for retransmissions. Also, when there is transition from PTM to PTP or PTP to PTM, to ensure lossless transition, there may be temporarily parallel reception on both PTM and PTP paths. The UE 100 maintains a transition timer and performs both the receptions. After the transition timer expiry, the UE 100 discontinues the former reception path and only continues with later reception paths. To facilitate the smooth transition, the gNB also ensures that PTP/PTM reception path is established in advance or maintained during switching. Further, HARQ feedback and transmission channels are accordingly switched during transition between PTM and PTP paths.

As in 3GPP 38.321, if the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) can be activated and deactivated by:
receiving the SCell activation/deactivation MAC CE;
configuring sCellDeactivationTimer timer per configured SCell (except the SCell configured with PUCCH, if any): the associated SCell is deactivated upon its expiry.
The MAC entity shall for each configured SCell:
1> if an SCell is configured with sCellState set to activated upon SCell configuration, or an SCell Activation/ Deactivation MAC CE is received activating the SCell:
2> if firstActiveDownlinkBWP-Id is not set to dormant BWP:
3>activate the SCell according to the timing defined in TS 38.213; i.e., apply normal SCell operation including:
4>SRS transmissions on the SCell;
4>CSI reporting for the SCell;
4>PDCCH monitoring on the SCell;
4>PDCCH monitoring for the SCell;
4>PUCCH transmissions on the SCell, if configured.
3> if the SCell was deactivated prior to receiving the SCell Activation/Deactivation MAC CE, or an SCell is configured with sCellState set to activated upon SCell configuration:
4>activate the DL BWP and UL BWP indicated by firstActiveDownlinkBWP-Id and firstActiveUplinkBWP-Id respectively;

3> if the MBS service is configured and/or activated on the SCell
4>Start reception of MBS service on the SCell on DL BWP indicated by firstActiveDownlinkBWP-Id
4>Continue, if already started or start reception of MBS service on the SCell on MBS BWP or MBS CFR associated with DL BWP indicated by firstActiveDownlinkBWP-Id;
5> perform CSI reporting for the MBS service on MBS BWP or MBS CFR or unicast uplink resources with identification of MBS CSI reporting
3> start or restart the sCellDeactivationTimer associated with the SCell according to the timing defined in TS 38.213;
3>(re-)initialize any suspended configured uplink grants of configured grant Type 1 associated with the SCell according to the stored configuration, if any, and to start in the symbol according to rules in clause 5.8.2;
3>trigger PHR according to clause 5.4.6.
2> else if firstActiveDownlinkBWP-Id is set to dormant BWP:
3>stop the bwp-InactivityTimer of the Serving Cell, if running.
3> if the SCell was deactivated prior to receiving the SCell Activation/Deactivation MAC CE, or if an SCell is configured with sCellState set to activated upon SCell configuration:
4>activate the DL BWP and UL BWP indicated by firstActiveDownlinkBWP-Id and firstActiveUplinkBWP-Id respectively.
3> start or restart the sCellDeactivationTimer associated with the SCell according to the timing defined in TS 38.213.
Alternatively, the MBS service can switch to default BWP in idle/inactive mode. The MBS service can switch to default MBS DL BWP in connected mode with associated configured/active MBS UL BWP for sending feedback as shown in FIG. 3H.

If an SCell Activation/Deactivation MAC CE is received deactivating the SCell; or
1> if the sCellDeactivationTimer associated with the activated SCell expires:
2>deactivate the SCell according to the timing defined in TS 38.213;
2>stop the sCellDeactivationTimer associated with the SCell;
2>stop the bwp-InactivityTimer associated with the SCell;
2>deactivate any active unicast BWP associated with the SCell;
2>not deactivate any active MBS BWP or MBS CFR associated with the SCell if no uplink feedback is configured for MBS service
2>clear any configured downlink assignment and any configured uplink grant Type 2 associated with the SCell respectively;
2>clear any PUSCH resource for semi-persistent CSI reporting associated with the SCell;
2>suspend any configured uplink grant Type 1 associated with the SCell;
2>flush all unicast HARQ buffers associated with the SCell;
2>cancel, if any, triggered consistent LBT failure for the SCell
When the SCell and/or SCG (Secondary Cell Group) is deactivated over which MBS BWP or MBS CFR is configured (i.e., associated with the unicast BWP of the Scell), the UE 100 continues to receive MBS service on the MBS BWP or MBS CFR associated with the SCell if no uplink feedback is configured for the MBS service.

1> if the SCell is deactivated:

2>not transmit SRS on the SCell;

2>not report CSI for the SCell;

2>not transmit on UL-SCH on the SCell;

2>not transmit on RACH on the SCell;

2>not monitor the PDCCH on the SCell for unicast;

2>not monitor the PDCCH for the SCell for unicast;

2>not transmit PUCCH on the SCell.

2>continue receiving MBS service on MBS BWP or MBS CFR associated with the SCell if no uplink feedback is configured for MBS service 3>monitor the PDCCH on the SCell for MBS 3>monitor the PDCCH for the SCell for MBS Embodiments herein also support cross-carrier scheduling for MBS reception. The UE 100 receives the PDCCH on the scheduling cell and monitors for G-RNTI/G-CS-RNTI and/or C-RNTI based MBS allocations on the unicast BWP and/or MBS BWP or MBS CFR on the scheduled cell (e.g., secondary cell, SCell). The UE 100 monitors the PDCCH on the serving cell for MBS reception even when SCell is deactivated, provided there is no uplink feedback configured for the MBS service. The UE 100 monitors the PDCCH for the serving cell for MBS reception even when serving cell is deactivated, provided there is no uplink feedback configured for the MBS service.

Alternatively, the UE 100 monitors the PDCCH on the serving cell for MBS reception even when serving cell is deactivated, and maps uplink feedback on the uplink physical channels over the MBS BWP or MBS CFR. The UE 100 monitors the PDCCH for the serving cell for MBS reception even when serving cell is deactivated, and maps uplink feedback on the uplink physical channels over the MBS BWP or MBS CFR.

In one embodiment herein, when the associated unicast BWP is deactivated or switched and/or serving cell is deactivated, the MBS service over MBS BWP or MBS CFR can be scheduled by the PDCCH over the new or different activated unicast BWP and/or new/different serving cell. The new or different activated unicast BWP may pertain to the same serving cell or different serving as that of serving cell for MBS BWP or frequency, i.e., it can be cross-carrier scheduling and/or cross-BWP scheduling. During the transition for the unicast BWP or serving cell, the MBS service can be switched or availed between PTM and PTP and/or unicast BWP and MBS BWP and/or connected and idle/inactive modes.

When the UE 100 receives MBS services over unicast BWP, preemption DCI is received and HARQ retransmission is configured for MBS service, the UE 100 applies preemption DCI for MBS service reception purpose, discards the indicated HARQ CBG (Code Block Group) or TB (Transport Block) and avails needed CBG/TB retransmission and perform HARQ soft-combining.

When the UE 100 receives MBS service over MBS BWP/MBS CFR confined in unicast BWP, preemption DCI is received and HARQ retransmission is configured for MBS service, the UE 100 ignores preemption DCI for MBS service reception purpose and continues HARQ soft combining.

In an embodiment herein, target cell MBS BWP or MBS CFR or unicast BWP configuration information are provided to the UE 100 by the source gNB in the handover command (RRC reconfiguration message). The source gNB exchanges the interest indication and/or service information and/or BWP/MBS CFR information for the UE 100 in source gNB/cell etc. to the target gNB. The target gNB provides the suitable MBS BWP or MBS CFR and/or unicast BWP configuration to the source gNB to support desired service continuity and lossless handover either in PTM or PTP reception modes.

Figure 4A:
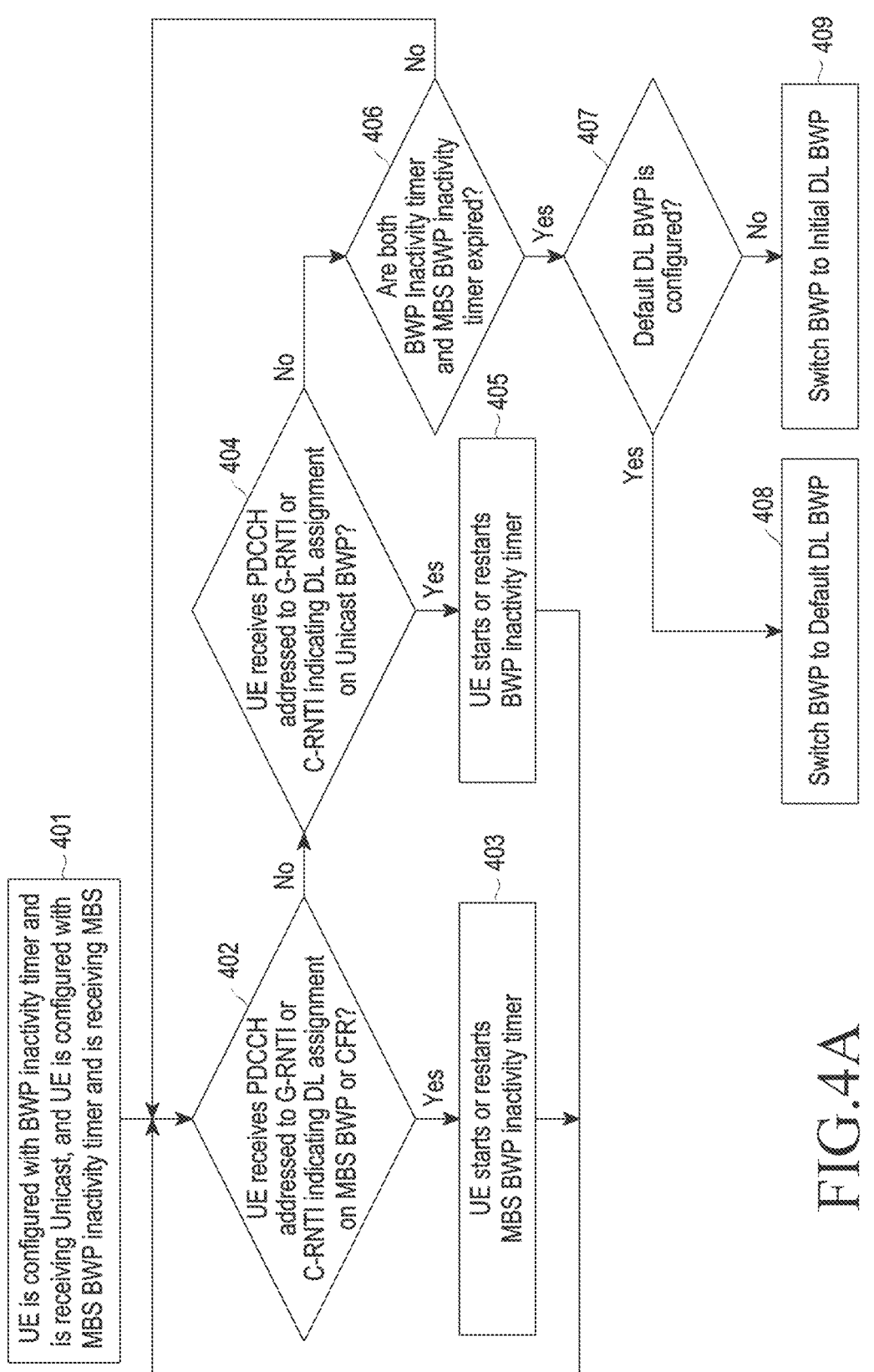
FIG. 4A depicts a method for operating BWP inactivity timer while MBS reception, and BWP switching upon expiry of BWP inactivity timer while MBS reception, according to embodiments as disclosed herein.

FIG. 4A depicts a method for operating BWP inactivity timer while MBS reception, and BWP switching upon expiry of BWP inactivity timer while MBS reception, according to embodiments.

In an embodiment herein, the MBS-bwp-InactivityTimer is maintained for MBS service reception on MBS BWP or MBS CFR. Referring to FIG. 4A, at step 401, the UE 100 is configured with the BWP inactivity timer and is receiving unicast, and the UE 100 is configured with the MBS BWP inactivity timer and is receiving MBS. At step 402, if a PDCCH addressed to G-RNTI/G-CS-RNTI or C-RNTI indicating downlink assignment is received on the active MBS BWP or MBS CFR or a MAC PDU is received in a configured downlink assignment for multicast, in step 403, the UE 100 starts or restarts the MBS-bwp-InactivityTimer for MBS BWP or MBS CFR associated with the active DL BWP. At step 404, if a PDCCH addressed to C-RNTI indicating downlink assignment is received on the active unicast BWP, at step 405, the UE 100 starts or restarts the bwp-InactivityTimer associated with the active DL BWP.

If No at the step 404, at step 406, when both the bwp-InactivityTimer and MBS-bwp-InactivityTimer associated with the active DL BWP expire, at steps 407 to 409, the UE 100 performs BWP switching to a default downlink BWP indicated by the defaultDownlinkBWP-Id, if the defaultDownlinkBWP-Id is configured. Else, the UE 100 performs BWP switching to the initial Downlink BWP. If No at the step 406, the UE 100 proceeds to the step 402.

In addition, when the bwp-InactivityTimer associated with the active DL BWP expires, the UE 100 may perform BWP switching to a default Downlink BWP indicated by the defaultDownlinkBWP-Id, if the defaultDownlinkBWP-Id is configured. Else, the UE 100 may perform BWP switching to the initial Downlink BWP.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or 1> if the defaultDownlinkBWP-Id is not configured, and the active DL BWP is not the initialDownlinkBWP, and the active DL BWP is not the BWP indicated by the dormantDownlinkBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant and LBT failure indication is not received from lower layers; or 2> if a MAC PDU is received in a configured downlink assignment:

3> if there is no ongoing Random Access procedure associated with the Serving Cell; or 3> if the ongoing Random Access procedure associated with the serving Cell is successfully completed upon reception of the PDCCH addressed to C-RNTI (as specified in clauses 5.1.4, 5.1.4a and 5.1.5):

4> start or restart the bwp-InactivityTimer associated with the active DL BWP.

2> if a PDCCH addressed to G-RNTI or C-RNTI indicating downlink assignment received on the active MBS BWP or MBS CFR or a MAC PDU is received in a configured downlink assignment for multicast;

4> start or restart the MBS-bwp-InactivityTimer for MBS BWP or MBS CFR associated with the active DL BWP.

2> if the bwp-InactivityTimer and MBS-bwp-Inactivity-Timer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantDownlinkBWP-Id if configured; or 2> if the defaultDownlinkBWP-Id is not configured, and the MAC entity switches to the DL BWP which is not the initialDownlinkBWP and is not indicated by the dormantDownlinkBWP-Id if configured:

3> start or restart the bwp-InactivityTimer associated with the active DL BWP.

Figure 4B:
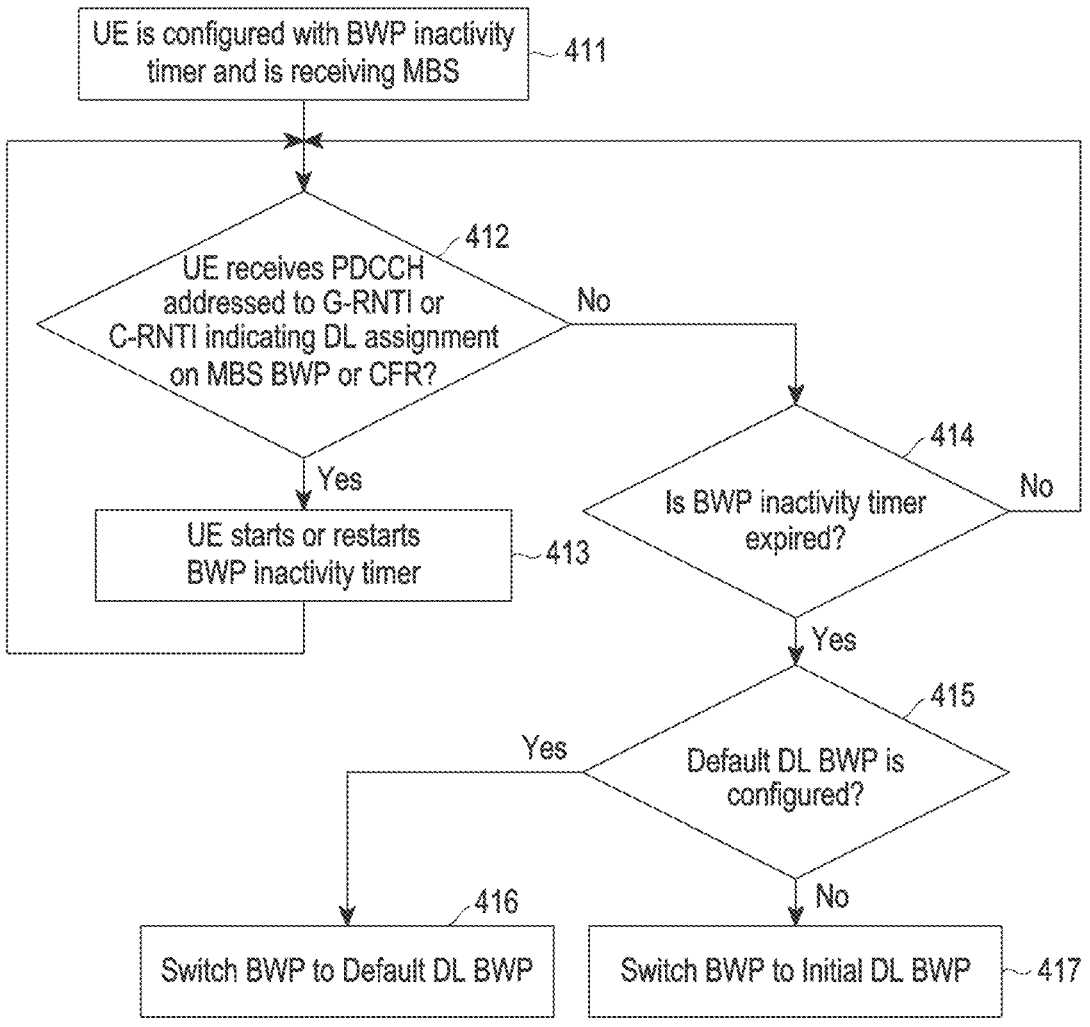
FIG. 4B depicts a method for operating BWP inactivity timer while MBS and unicast reception, and BWP switching upon expiry of BWP inactivity timer while MBS and unicast reception, according to embodiments as disclosed herein.

FIG. 4B depicts a method for operating BWP inactivity timer while MBS and unicast reception, and BWP switching upon expiry of BWP inactivity timer while MBS and unicast reception, according to embodiments.

Referring to FIG. 4B, at step 411, the UE 100 is configured with the BWP inactivity timer, and is receiving MBS. When the UE 100 receives MBS service on MBS BWP or CFR associated to unicast BWP as shown FIG. 4B and if PDCCH to G-RNTI/G-CS-RNTI or C-RNTI indicating downlink assignment is received on the on the active MBS BWP or MBS CFR or a MAC PDU is received in a configured downlink assignment for multicast at step 412, at step 413, the UE 100 starts or restarts the bwp-InactivityTimer associated with the active DL BWP. At step 414, when the bwp-InactivityTimer associated with the active DL BWP expires, At steps 415 to 417, the UE 100 performs BWP switching to a default downlink BWP indicated by the defaultDownlinkBWP-Id, if the defaultDownlinkBWP-Id is configured. Else, the UE 100 performs BWP switching to the initial Downlink BWP. If No at the step 414, the UE 100 proceeds to the step 412.

Figure 4C:
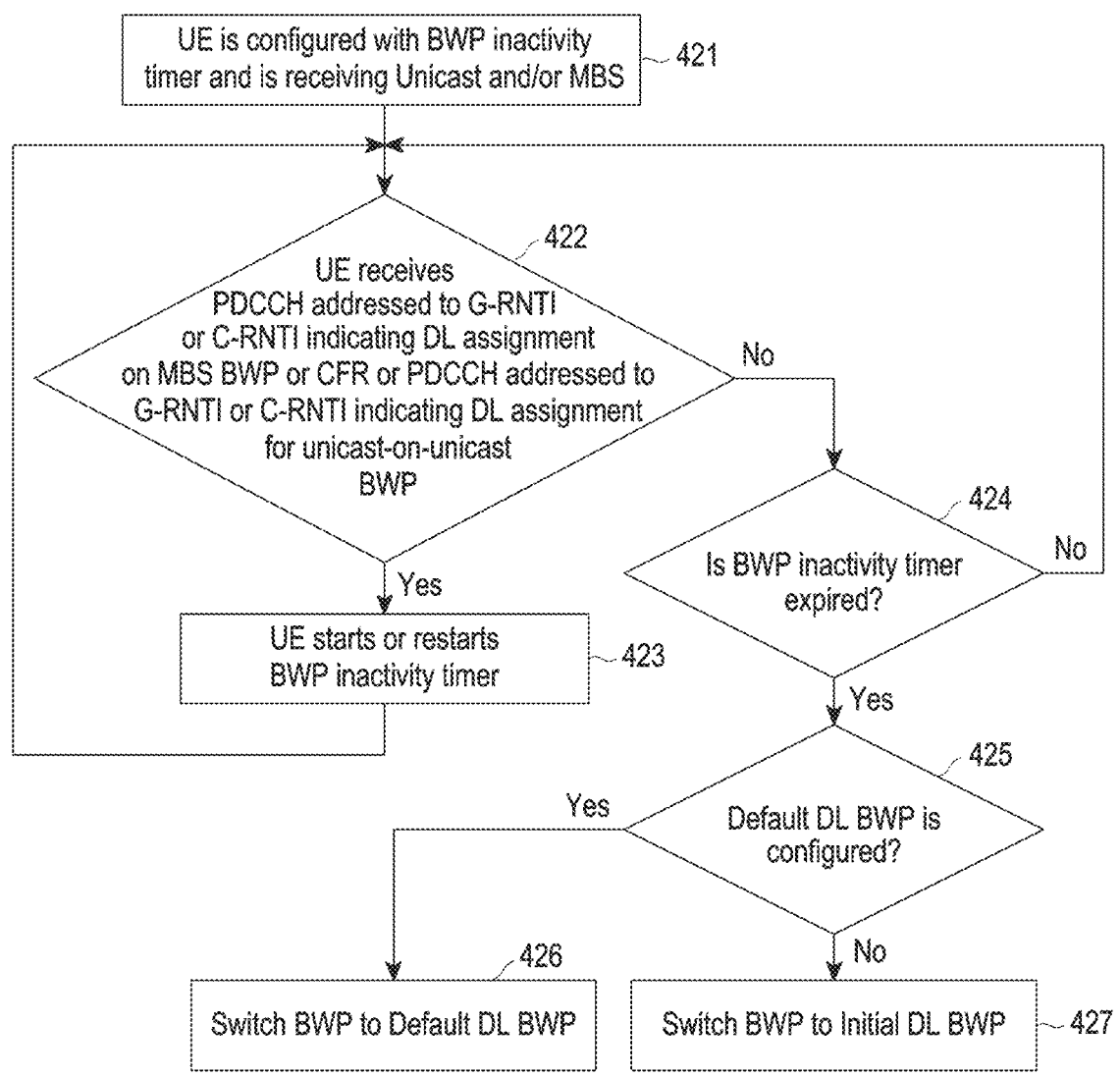
FIG. 4C depicts a method for operating MBS BWP inactivity timer while MBS reception and BWP inactivity timer while unicast reception, and BWP switching upon expiry of both MBS BWP inactivity timer while MBS reception and BWP inactivity timer while unicast reception, according to embodiments as disclosed herein.

FIG. 4C depicts a method for operating MBS BWP inactivity timer while MBS reception and BWP inactivity timer while unicast reception, and BWP switching upon expiry of both MBS BWP inactivity timer while MBS reception and BWP inactivity timer while unicast reception, according to embodiments.

In an embodiment herein, the UE 100 can use the same common bwp-InactivityTimer for MBS service reception on MBS BWP or MBS CFR as shown in FIG. 4C and for unicast and/or MBS services on unicast BWP. Referring to FIG. 4C, at step 421, the UE 100 is configured with the BWP inactivity timer, and is receiving unicast and/or MBS. At step 422, if a PDCCH addressed to G-RNTI/G-CS-RNTI or a MAC PDU is received in a configured downlink assignment for multicast or C-RNTI indicating downlink assignment is received on the active MBS BWP or MBS CFR or a MAC PDU is received in a configured downlink assignment (for unicast), at step 423, the UE 100 starts or restarts the bwp-InactivityTimer for MBS BWP or MBS CFR associated with the active DL BWP. At step 424, when the bwp-InactivityTimer associated with the active DL BWP expires, at steps 425 to 427, the UE 100 performs BWP switching to a default downlink BWP indicated by the defaultDownlinkBWP-Id, if the defaultDownlinkBWP-Id is configured Else, the UE 100 performs BWP switching to the initial Downlink BWP. If No at the step 424, the UE 100 proceeds to the step 422.

In an embodiment, bwp-InactivityTimer is not started or restarted when PDCCH addressed to G-RNTI/G-CS-RNTI for broadcast MBS is received.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or 1> if the defaultDownlinkBWP-Id is not configured, and the active DL BWP is not the initialDownlinkBWP, and the active DL BWP is not the BWP indicated by the dormantDownlinkBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a PDCCH addressed to G-RNTI/G-CS-RNTI or C-RNTI indicating downlink assignment received on the MBS BWP or MBS CFR associated with active unicast BWP; or 2> if a MAC PDU is transmitted in a configured uplink grant and LBT failure indication is not received from lower layers; or 2> if a MAC PDU is received in a configured downlink assignment: or 2> if a MAC PDU is received in a configured downlink assignment for multicast: or 3> if there is no ongoing Random Access procedure associated with the Serving Cell; or 3> if the ongoing Random Access procedure associated with the serving Cell is successfully completed upon reception of the PDCCH addressed to C-RNTI (as specified in clauses 5.1.4, 5.1.4a and 5.1.5):

4> start or restart the bwp-InactivityTimer associated with the active DL BWP.

2> if the bwp-InactivityTimer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantDownlinkBWP-Id if configured; or 2> if the defaultDownlinkBWP-Id is not configured, and the MAC entity switches to the DL BWP which is not the initialDownlinkBWP and is not indicated by the dormantDownlinkBWP-Id if configured:

3> start or restart the bwp-InactivityTimer associated with the active DL BWP.

When the UE 100 is receiving or interested to receive a MBS service (which is low QoS broadcast or multicast in nature), the UE 100 is not required to receive dedicated configuration from the network and/or the UE 100 does not provide any uplink feedback for the MBS service packet reception e.g., HARQ feedback, RLC status report etc. The network may not be aware that the UE 100 is receiving MBS service over the MBS BWP or MBS CFR which is confined in the unicast BWP. Consequently, any further decision by the network to switch, deactivate or make dormant the current unicast BWP (including switching to smaller or larger unicast BWP or unicast BWP which does not support MBS BWP or MBS CFR or specific MBS services(s) etc.) and/or serving cell deactivation affects the MBS service reception for the UE 100. With the UE 100 assistance information, the UE 100 can inform one or more of the following (but not limited to):

MBS reception status e.g., receiving broadcast/multicast in PTM mode for no-uplink feedback mode

MBS BWP

MBS CFR

MBS service(s) which the UE 100 is receiving or interested to receive in PTM mode Request for deferment or prevention of unicast BWP deactivation and/or switching Preferred DRX parameters for MBS or Unicast reception to better align the reception for unicast and MBS or enhance power efficiency The UE 100 capability for simultaneous reception e.g., support for BWPs, CAs, dual/multiple RX/TX capability, Carrier Aggregation support, Dual connectivity support etc.

UE's preferred RRC state based on MBS reception

Need for BWP switch or MBS CFR including smaller or larger BWP or MBS CFR or maintain of existing BWP/MBS CFR Max bandwidth or BWP size needed for unicast or multicast or combined In an embodiment herein, the UE 100 may have multiple RX/TX capability and/or support for dual connectivity and/or support for MUSIM (Multi-SIM) and/or support for Carrier-aggregation (CA) and/or support for multiple RATS (Radio access Techniques like 4G or 5G or LTE eMBMS or NR MBS). The UE 100 can support reception of MBS along with unicast reception on two different carriers/cells/SIMs/RATs/RFs/BWPs etc. concurrently. The UE 100 informs the network the capability information of the UE 100. Further, the UE 100 utilizes its capability to perform concurrent unicast and multicast data reception as well as uplink HARQ feedback, measurement operations, measurement reporting, CSI feedback and/or mobility transitions.

In an embodiment herein, the UE 100 supports DSS (Dynamic Spectrum Sharing) along with unicast and/or MBS reception. DSS involves sharing of the spectrum in time/frequency domain with two RATs like LTE and NR and sharing can be in a fixed or dynamic ratio basis.

In an embodiment herein, the one or more of the aforementioned information or parameters can be provided by the UE 100 to the network in MBS Interest Indication message, Counting Response message or UL Information transfer message or RRC connection request or RRCResume request (e.g., when receiving MBS service in idle or inactive mode) or any other RRC message or MAC CE (control element).

The transmission of the message can be triggered either periodically or on a pre-defined event occurring (e.g., when unicast traffic pattern changes, DataInactivitytimer expires, the UE 100 receives DCFMAC/RRC message for BWP switching or deactivation or dormancy of the unicast BWP, or when trigger for MBS interest Indication or Counting response occurs etc.).

Figure 5:
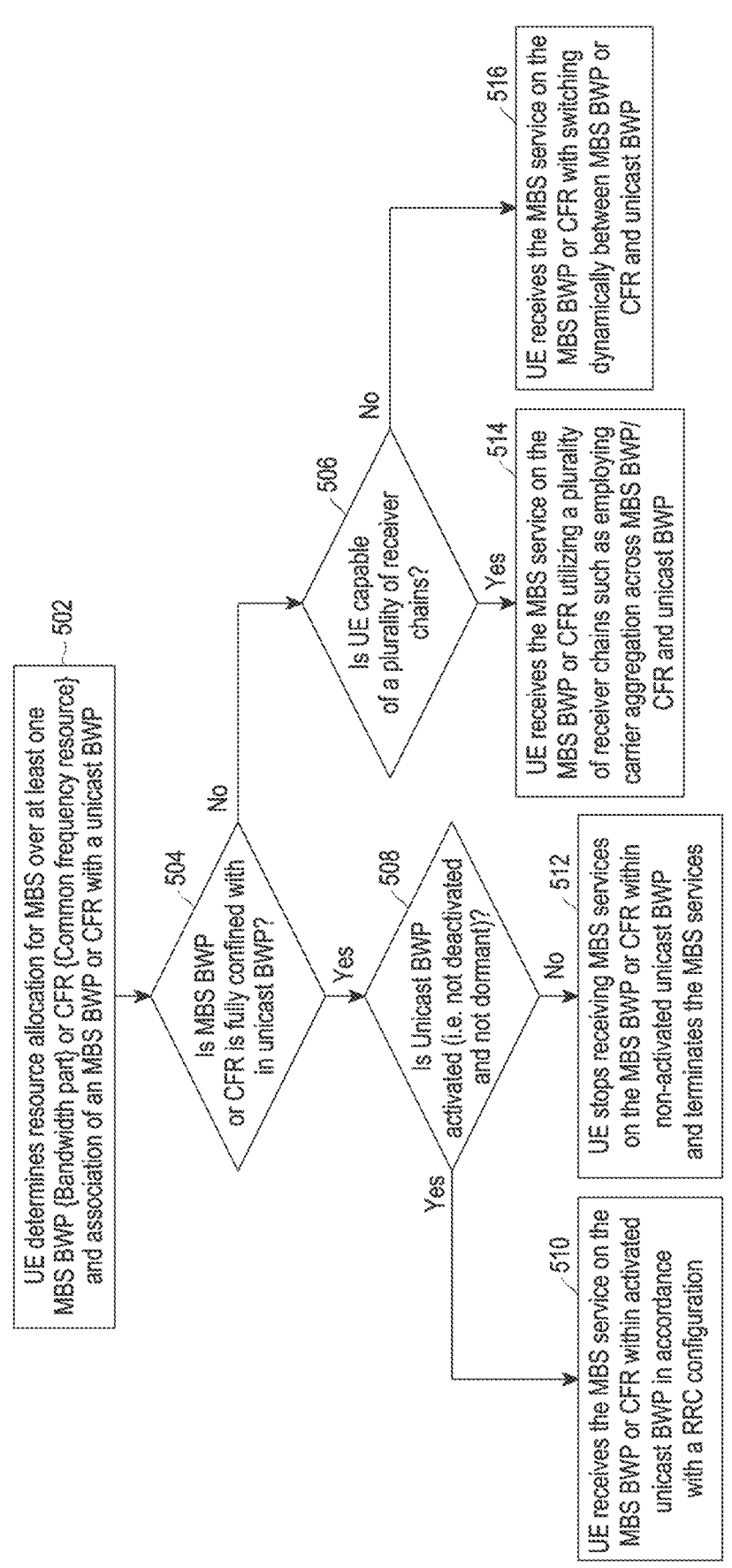
FIG. 5 depicts a method for allocating resources to multicast and broadcast services (MBS) in a network, according to embodiments as disclosed herein.

FIG. 5 shows a method 500 for allocating resources to multicast and broadcast services (MBS) in a network, according to embodiments.

At step 502, the method 500 includes determining, by the UE 100, resource allocation for MBS over at least one MBS BWP or CFR and association of the MBS BWP or CFR with the unicast BWP. At step 504, the method 500 includes checking, by the UE 100, if MBS BWP or CFR is fully confined within the unicast BWP, if yes then at step 508, the method 500 includes checking, by the UE 100, if the unicast BWP is activated, deactivated and not dormant, if yes then at step 510, the method 500 includes receiving, by the UE 100, the MBS services on the MBS BWP or CFR within the activated unicast BWP in accordance with RRC configuration, else at step 512, the method 500 includes stopping, by the UE 100, receiving MBS services on the MBS BWP or CFR within non-activated unicast BWP and terminates the MBS services. At step 506, the method 500 includes checking if the UE 100 is capable of a plurality of receiver chains, if yes then at step 514 the method 500 includes receiving, by the UE 100, MBS services on the MBS BWP or CFR utilizing the plurality of receiver chains. At step 516, the method 500 includes receiving, by the UE 100, the MBS service on the MBS BWP or CFR with switching dynamically between MBS BWP or CFR and unicast BWP.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a user equipment (UE) in a wireless communication system supporting multicast and broadcast services (MBS), the method comprising:

receiving, from a base station, configuration information for configuring an MBS frequency resource within a downlink bandwidth part (BWP) via a radio resource control (RRC) signaling;

receiving, from the base station, downlink control information (DCI) based on a group-radio network temporary identifier (G-RNTI) on a physical downlink control channel (PDCCH), the DCI including time domain resource assignment (TDRA) for scheduling of a physical downlink shared channel (PDSCH) for multicast and frequency domain resource assignment (FDRA) for scheduling of the PDSCH for multicast, wherein the FDRA is based on the configuration information for configuring the MBS frequency resource; and performing a BWP switching to a BWP indicated by a default downlink BWP-ID.

2. The method of claim 1, wherein the configuration information indicates a common frequency resource (CFR) associated with the downlink BWP, the MBS frequency resource including the CFR.

3. The method of claim 2, wherein the configuration information includes at least one of information on a size of the CFR and information on frequency domain location for the MBS.

4. The method of claim 1, further comprising:

identifying that a PDCCH, addressed to a G-RNTI, indicating downlink assignment is received on an active BWP; and starting or restarting a BWP inactivity timer associated with the active BWP based on identifying that the PDCCH, addressed to the G-RNTI, indicating the downlink assignment is received on the active BWP, wherein the BWP inactivity timer is configured for an activated serving cell of the UE.

5. The method of claim 4, wherein the performing of the BWP switching based on whether the default downlink BWP-ID is configured comprises:

identifying that the BWP inactivity timer associated with the active BWP expires and the default downlink BWP-ID is configured; and performing the BWP switching to a BWP indicated by the default downlink BWP-ID based on identifying that the BWP inactivity timer associated with the active BWP expires and the default downlink BWP-ID is configured.

6. The method of claim 4, wherein the performing of the BWP switching based on whether the default downlink BWP-ID is configured comprises:

identifying that the BWP inactivity timer expires and the default downlink BWP-ID is not configured; and performing the BWP switching to an initial downlink BWP based on identifying that the BWP inactivity timer expires and the default downlink BWP-ID is not configured.

7. A user equipment (UE) in a wireless communication system supporting multicast and broadcast services (MBS), the UE comprising:

a transceiver; and a processor configured to:

receive, via the transceiver from a base station, configuration information for configuring an MBS frequency resource within a downlink bandwidth part (BWP) via a radio resource control (RRC) signaling, receive, via the transceiver from the base station, downlink control information (DCI) based on a group-radio network temporary identifier (G-RNTI) on a physical downlink control channel (PDCCH), the DCI including time domain resource assignment (TDRA) for scheduling of a physical downlink shared channel (PDSCH) for multicast and frequency domain resource assignment (FDRA) for scheduling of the PDSCH for multicast, wherein the FDRA is based on the configuration information for configuring the MBS frequency resource, and perform a BWP switching to a BWP indicated by a default downlink BWP-ID.

8. The UE of claim 7, wherein the configuration information indicates a common frequency resource (CFR) associated with the downlink BWP, the MBS frequency resource including the CFR.

9. The UE of claim 8, wherein the configuration information includes at least one of information on a size of the CFR and information on frequency domain location for the MBS.

10. The UE of claim 7, wherein the processor is further configured to:

identify that a PDCCH, addressed to a G-RNTI, indicating downlink assignment is received on an active BWP, and start or restart a BWP inactivity timer associated with the active BWP based on identifying that the PDCCH, addressed to the G-RNTI, indicating the downlink assignment is received on the active BWP, and wherein the BWP inactivity timer is configured for an activated serving cell of the UE.

11. The UE of claim 10, wherein the processor is further configured to:

identify that the BWP inactivity timer associated with the active BWP expires and the default downlink BWP-ID is configured, and perform the BWP switching to a BWP indicated by the default downlink BWP-ID based on identifying that the BWP inactivity timer associated with the active BWP expires and the default downlink BWP-ID is configured.

12. The UE of claim 10, wherein the processor is further configured to:

identify that the BWP inactivity timer expires and the default downlink BWP-ID is not configured, and perform the BWP switching to an initial downlink BWP based on identifying that the BWP inactivity timer expires and the default downlink BWP-ID is not configured.

13. A method performed by a base station in a wireless communication system supporting multicast and broadcast services (MBS), the method comprising:

transmitting, to a user equipment (UE), configuration information for configuring an MBS frequency resource within a downlink bandwidth part (BWP) via a radio resource control (RRC) signaling;

transmitting, to the UE, downlink control information (DCI) based on a group-radio network temporary identifier (G-RNTI) on a physical downlink control channel (PDCCH), the DCI including time domain resource assignment (TDRA) for scheduling of a physical downlink shared channel (PDSCH) for multicast and frequency domain resource assignment (FDRA) for scheduling of the PDSCH for multicast, wherein the FDRA is based on the configuration information for configuring the MBS frequency resource; and determining whether to configure a default downlink BWP-ID associated with a BWP switching.

14. The method of claim 13, wherein the configuration information indicates a common frequency resource (CFR) associated with the downlink BWP, the MBS frequency resource including the CFR.

15. The method of claim 14, wherein the configuration information includes at least one of information on a size of the CFR and information on frequency domain location for the MBS.

16. The method of claim 13, further comprising:

configuring a BWP inactivity timer associated with an active BWP for an activated serving cell of the UE, wherein a PDCCH, addressed to a G-RNTI, indicating downlink assignment is transmitted on the active BWP by the base station.

17. A base station in a wireless communication system supporting multicast and broadcast services (MBS), the base station comprising:

a transceiver; and a processor configured to:

transmit, to a user equipment (UE) via the transceiver, configuration information for configuring an MBS frequency resource within a downlink bandwidth part (BWP) via a radio resource control (RRC) signaling, transmit, to the UE via the transceiver, downlink control information (DCI) based on a group-radio network temporary identifier (G-RNTI) on a physical downlink control channel (PDCCH), the DCI including time domain resource assignment (TDRA) for scheduling of a physical downlink shared channel (PDSCH) for multicast and frequency domain resource assignment (FDRA) for scheduling of the PDSCH for multicast, wherein the FDRA is based on the configuration information for configuring the MBS frequency resource, and determine whether to configure a default downlink BWP-ID associated with a BWP switching.

18. The base station of claim 17, wherein the configuration information indicates a common frequency resource (CFR) associated with the downlink BWP, the MBS frequency resource including the CFR.

19. The base station of claim 18, wherein the configuration information includes at least one of information on a size of the CFR and information on frequency domain location for the MBS.

20. The base station of claim 17, wherein the processor is further configured to configure a BWP inactivity timer associated with an active BWP for an activated serving cell of the UE, and wherein a PDCCH, addressed to a G-RNTI, indicating downlink assignment is transmitted on the active BWP by the base station.

* * * * *